United States Patent
Oono et al.

(10) Patent No.: US 8,027,231 B2
(45) Date of Patent: *Sep. 27, 2011

(54) INFORMATION RECORDING APPARATUS AND METHOD, INFORMATION REPRODUCING APPARATUS AND METHOD, AND COMPUTER PROGRAM

(75) Inventors: Kenichi Oono, Tokorozawa (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 12/094,320

(22) PCT Filed: Nov. 11, 2006

(86) PCT No.: PCT/JP2006/323189
§ 371 (c)(1),
(2), (4) Date: May 20, 2008

(87) PCT Pub. No.: WO2007/058356
PCT Pub. Date: May 24, 2007

(65) Prior Publication Data
US 2009/0161505 A1    Jun. 25, 2009

(30) Foreign Application Priority Data
Nov. 21, 2005  (JP) .................................. 2005-336248

(51) Int. Cl.
*G11B 7/00* (2006.01)

(52) U.S. Cl. .................................. 369/44.32; 369/30.12
(58) Field of Classification Search .................. None
See application file for complete search history.

(56) References Cited

U.S. PATENT DOCUMENTS 6,687,200 B1 *  2/2004  Kobayashi ................. 369/44.26

FOREIGN PATENT DOCUMENTS

| JP | 6-068502 | 3/1994 |
| JP | 8-147721 | 6/1996 |
| JP | 11-039678 | 2/1999 |
| JP | 2001-023185 | 1/2001 |

OTHER PUBLICATIONS

JP 2001-023185 English translation.*
International Search Report From Application No. PCT/JP2006/323189.

* cited by examiner

*Primary Examiner* — Van Chow
(74) *Attorney, Agent, or Firm* — Young & Thompson

(57) ABSTRACT

An information recording apparatus (1) is provided with: a first judging device (191) for judging whether or not a tracking error signal is greater than or equal to a first threshold value; a detecting device (192) for detecting, as a detection angle, a rotation angle of an information recording medium (100) when it is judged that the tracking error signal is greater than or equal to the first threshold value; and a second judging device (193) for judging whether or not the judgment that the tracking error signal is greater than or equal to the first threshold value is performed at the same detection angle.

14 Claims, 14 Drawing Sheets

[FIG. 1]
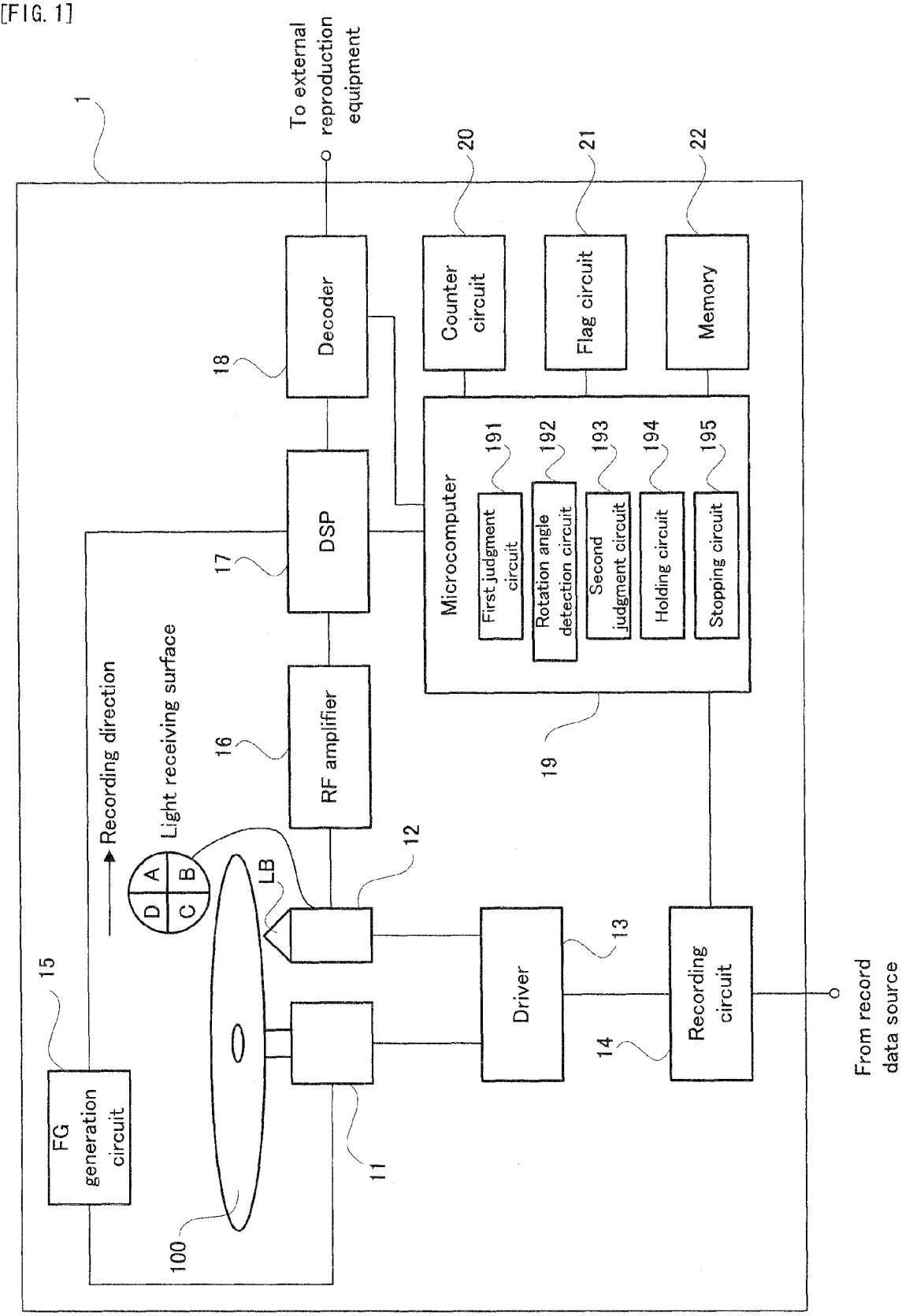

[FIG. 2]
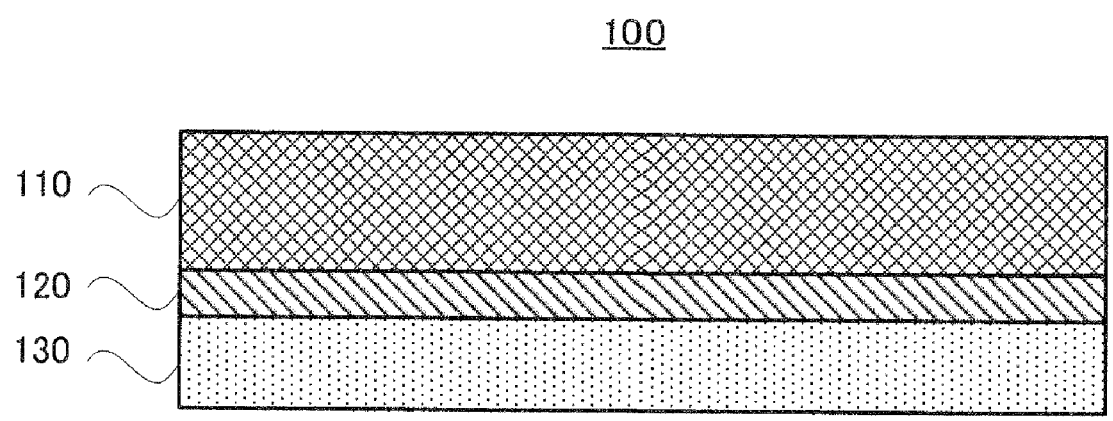

[FIG. 3]
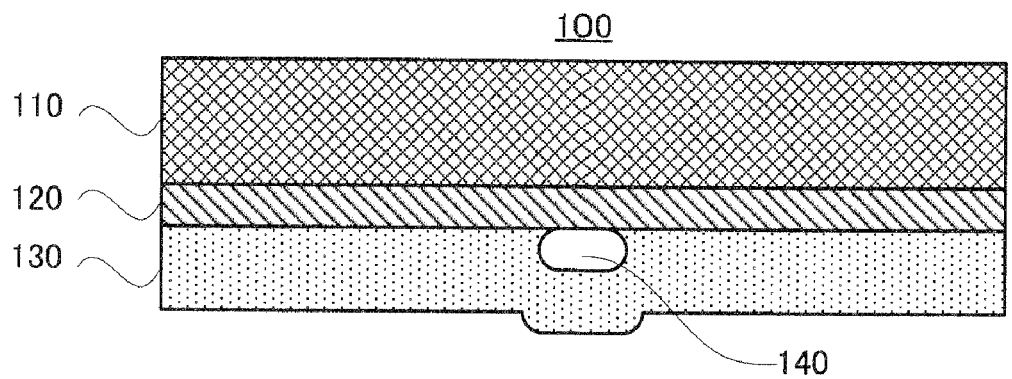
(a)
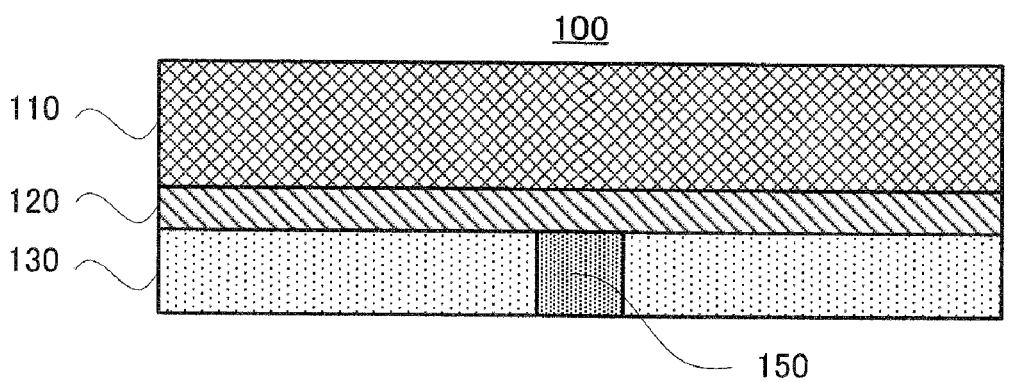
(b)
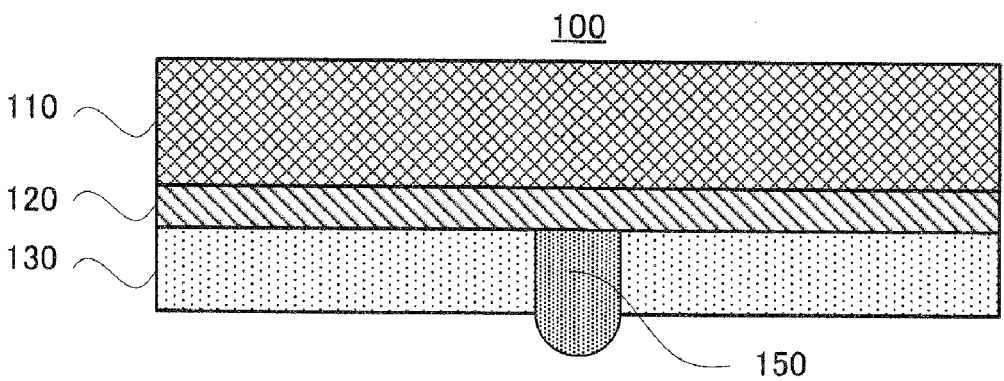
(c)

[FIG. 4]
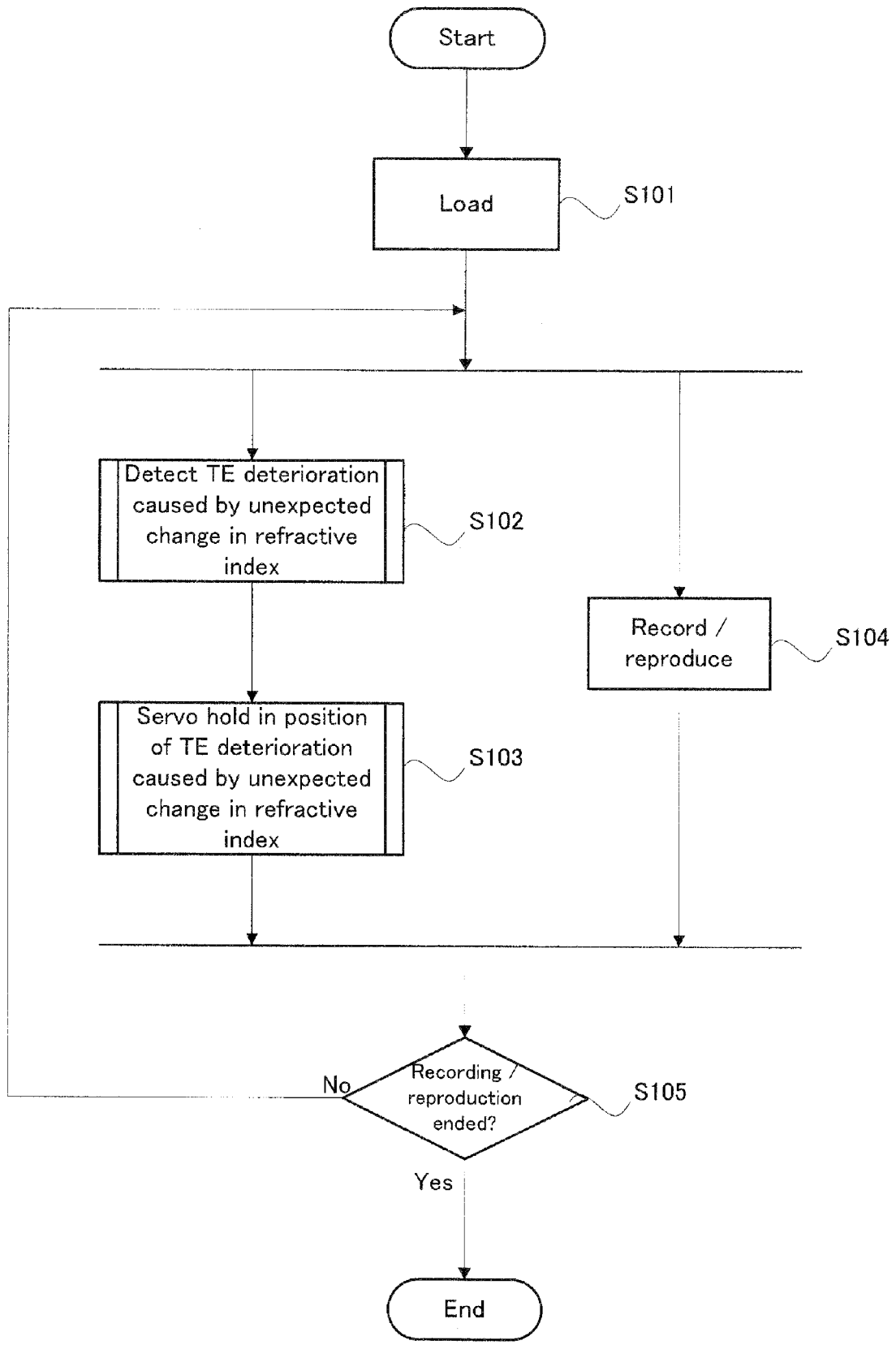

[FIG. 5]
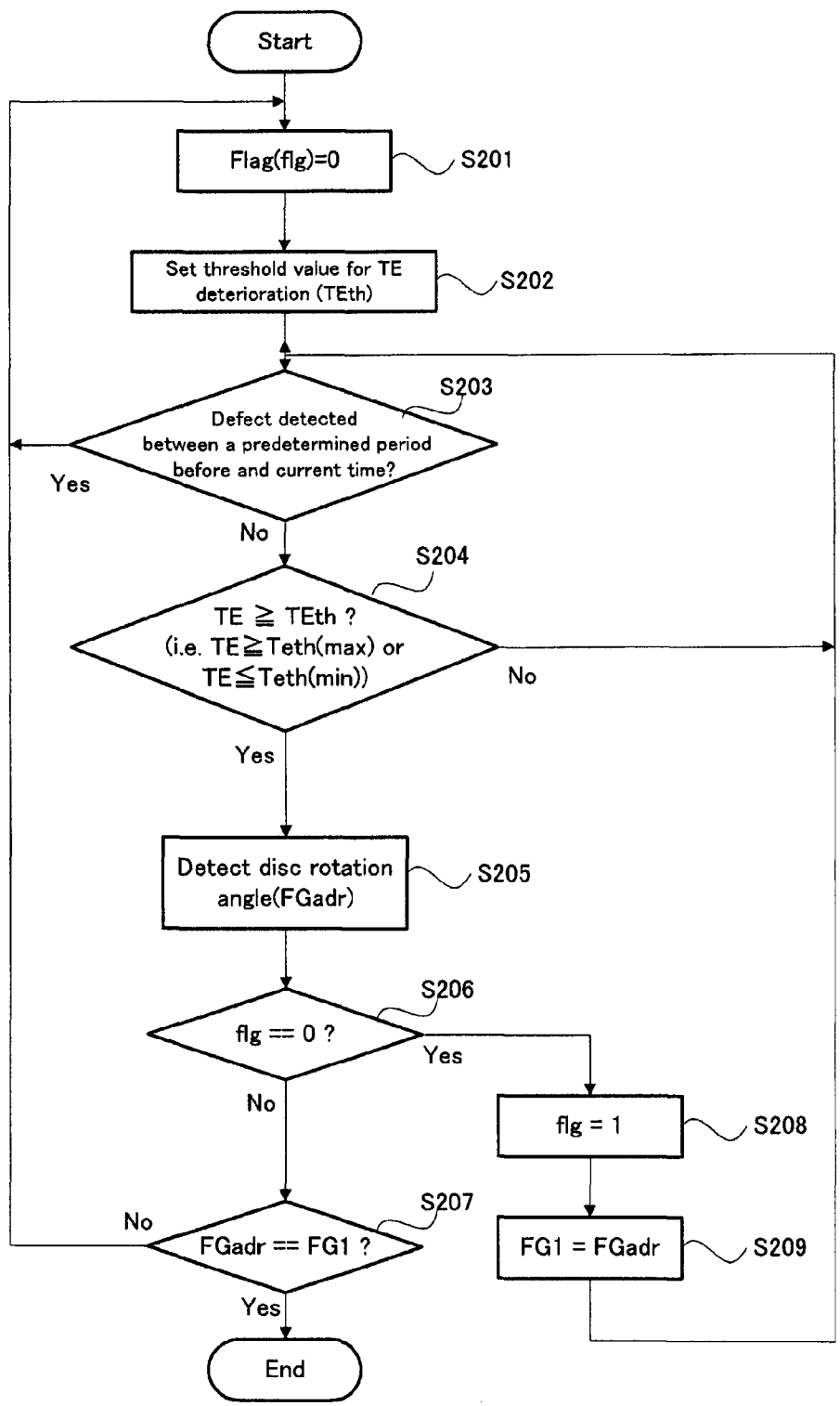

[FIG. 6]
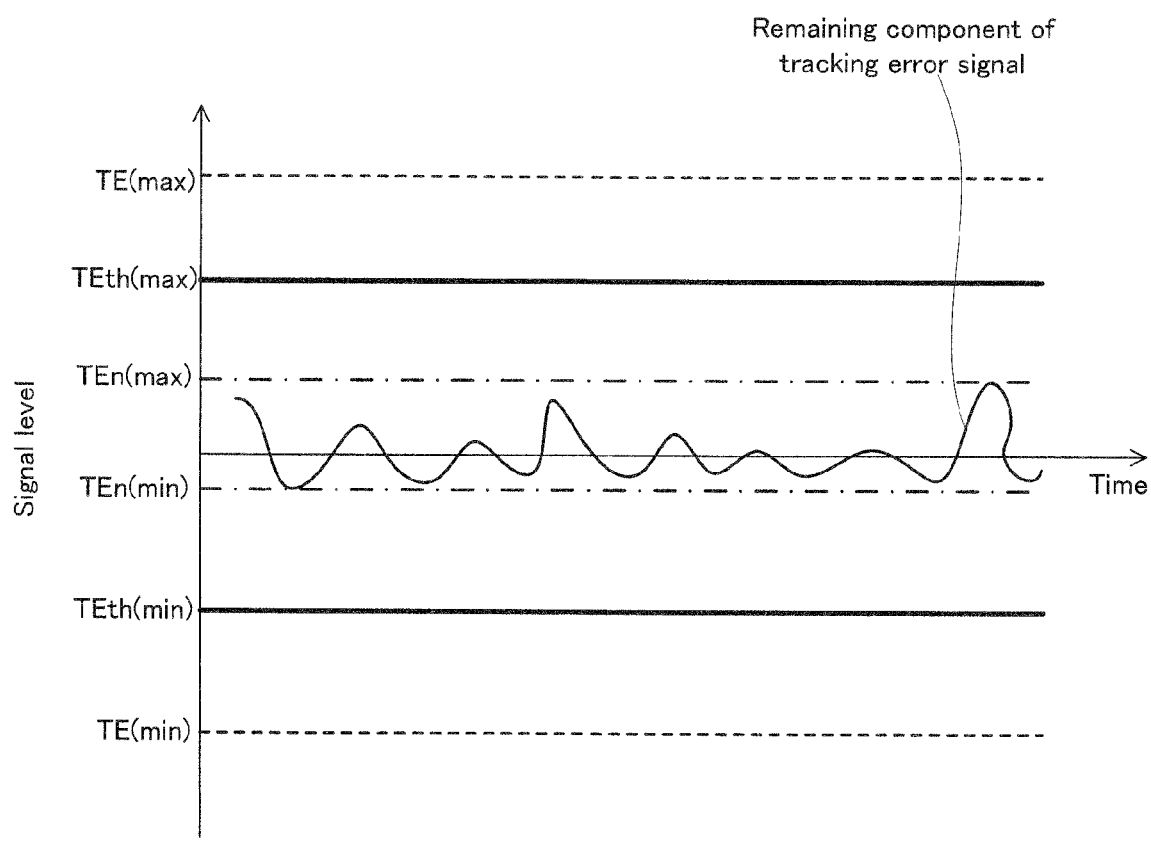

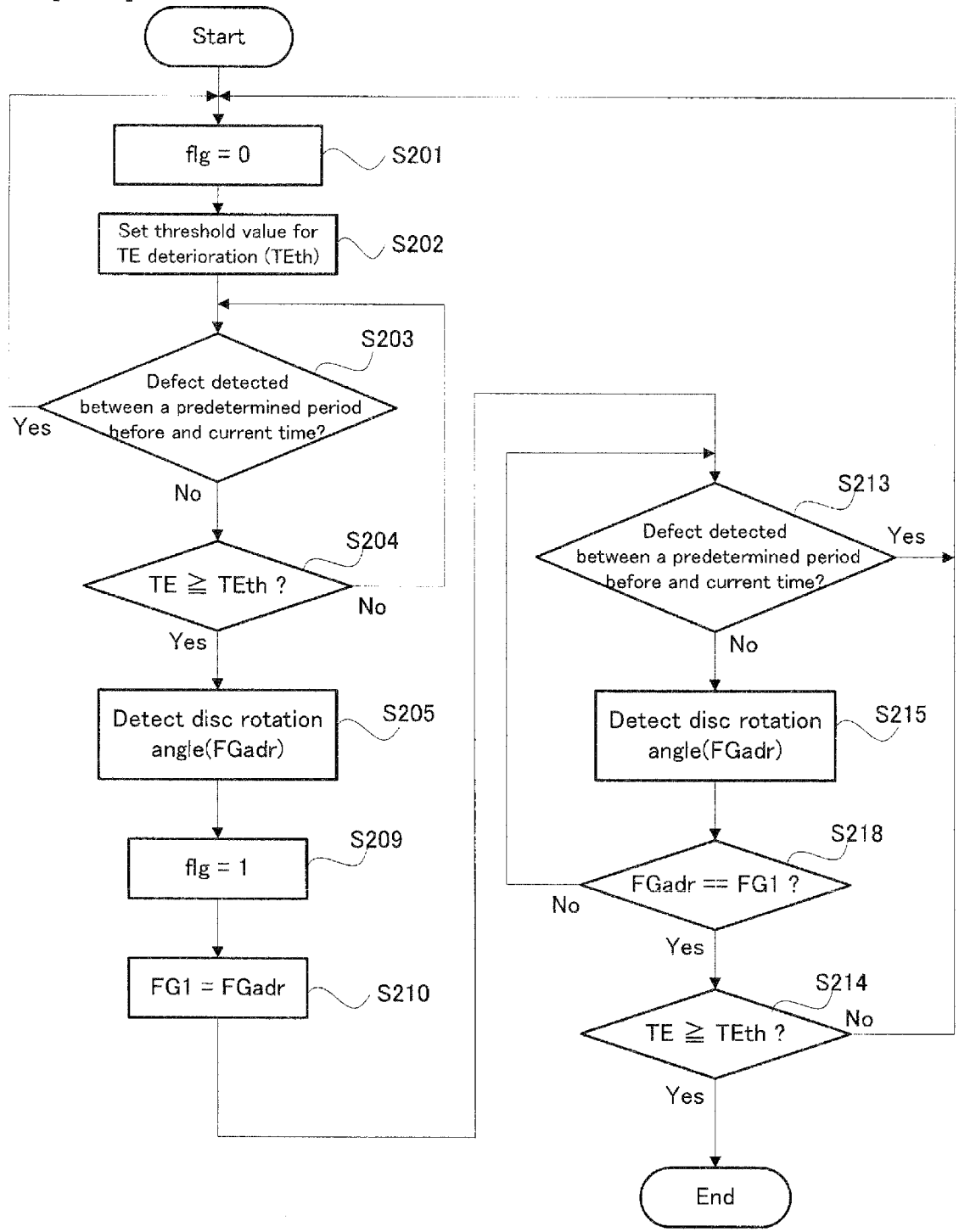
[FIG. 8]

[FIG. 9]
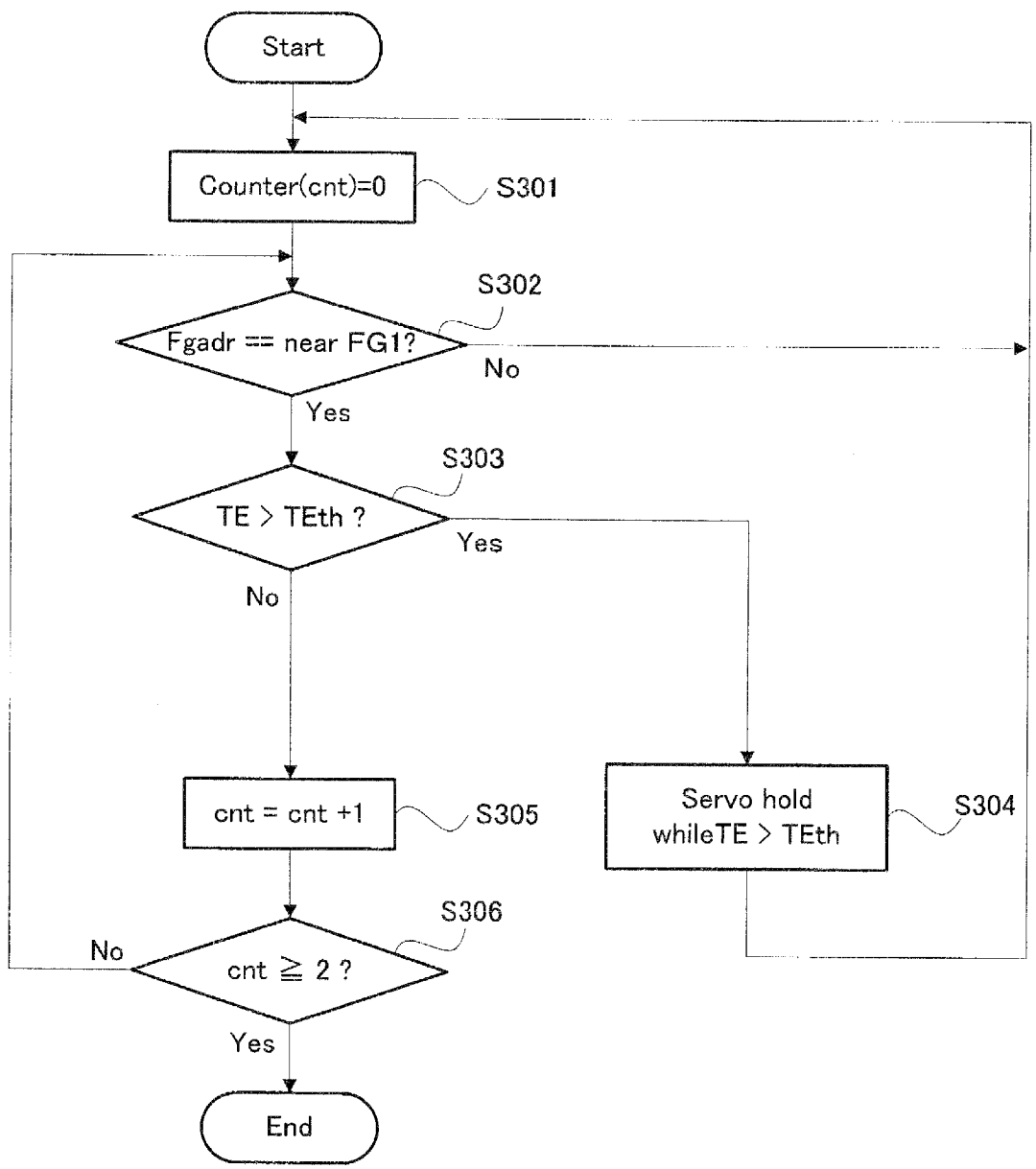

[FIG. 10]
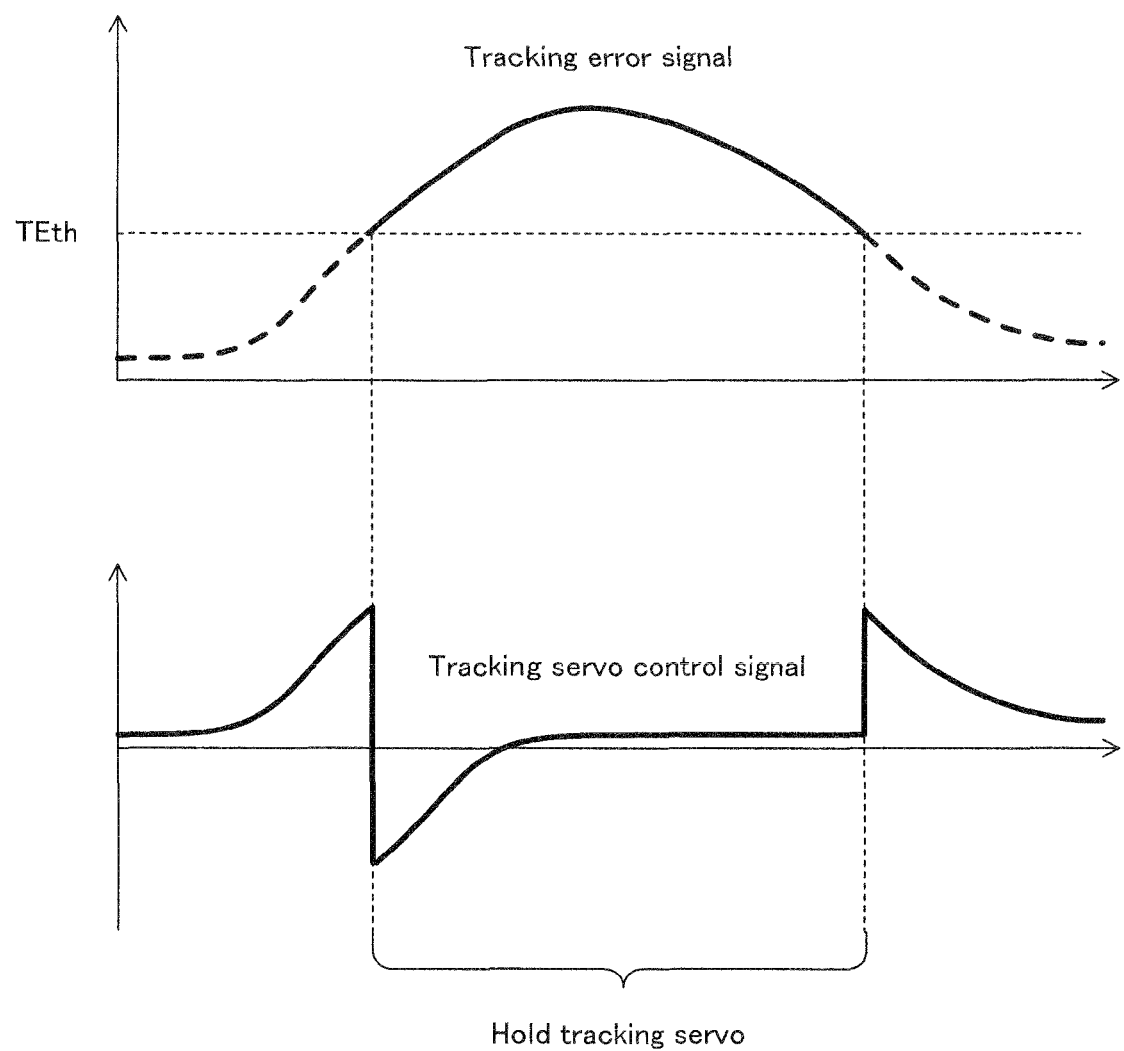

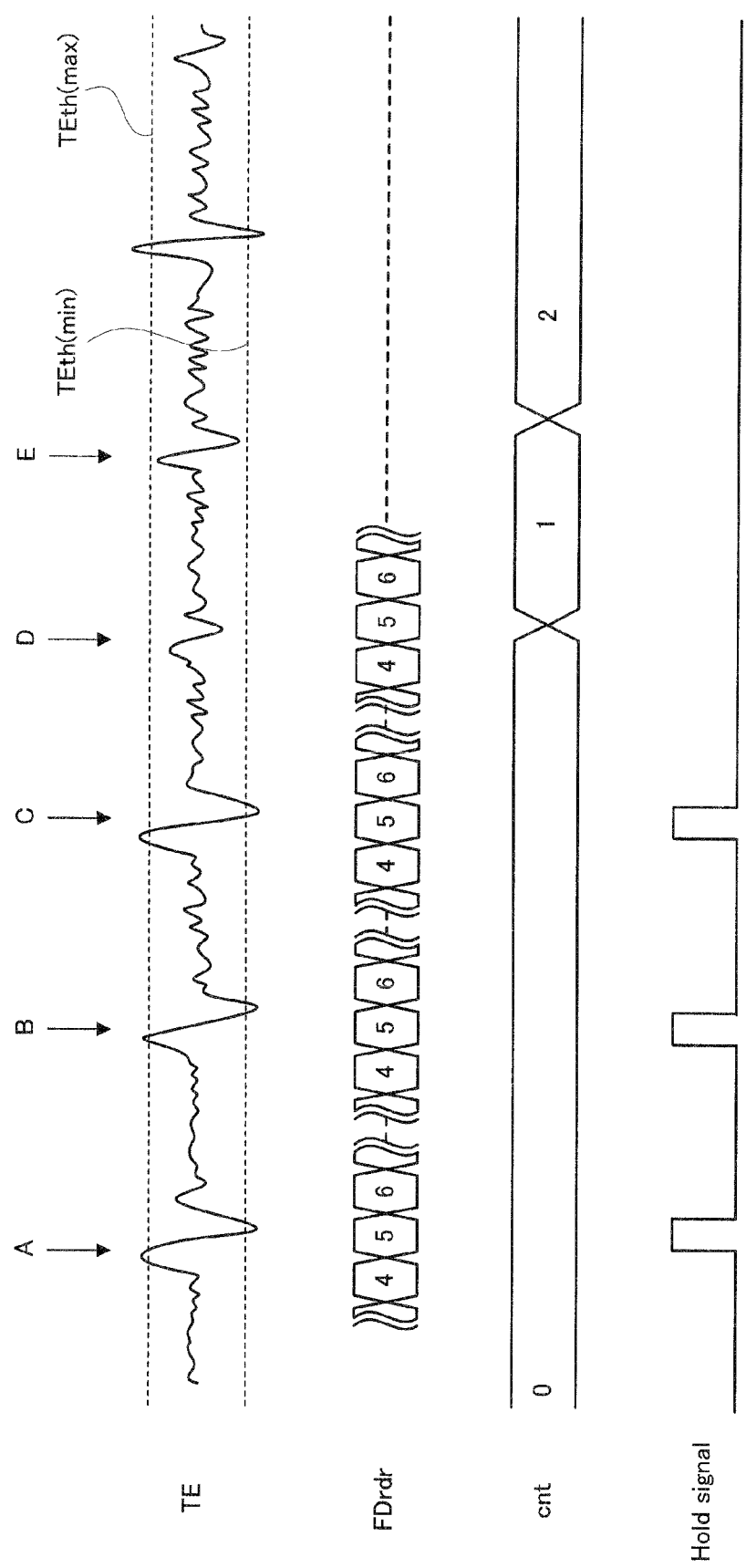

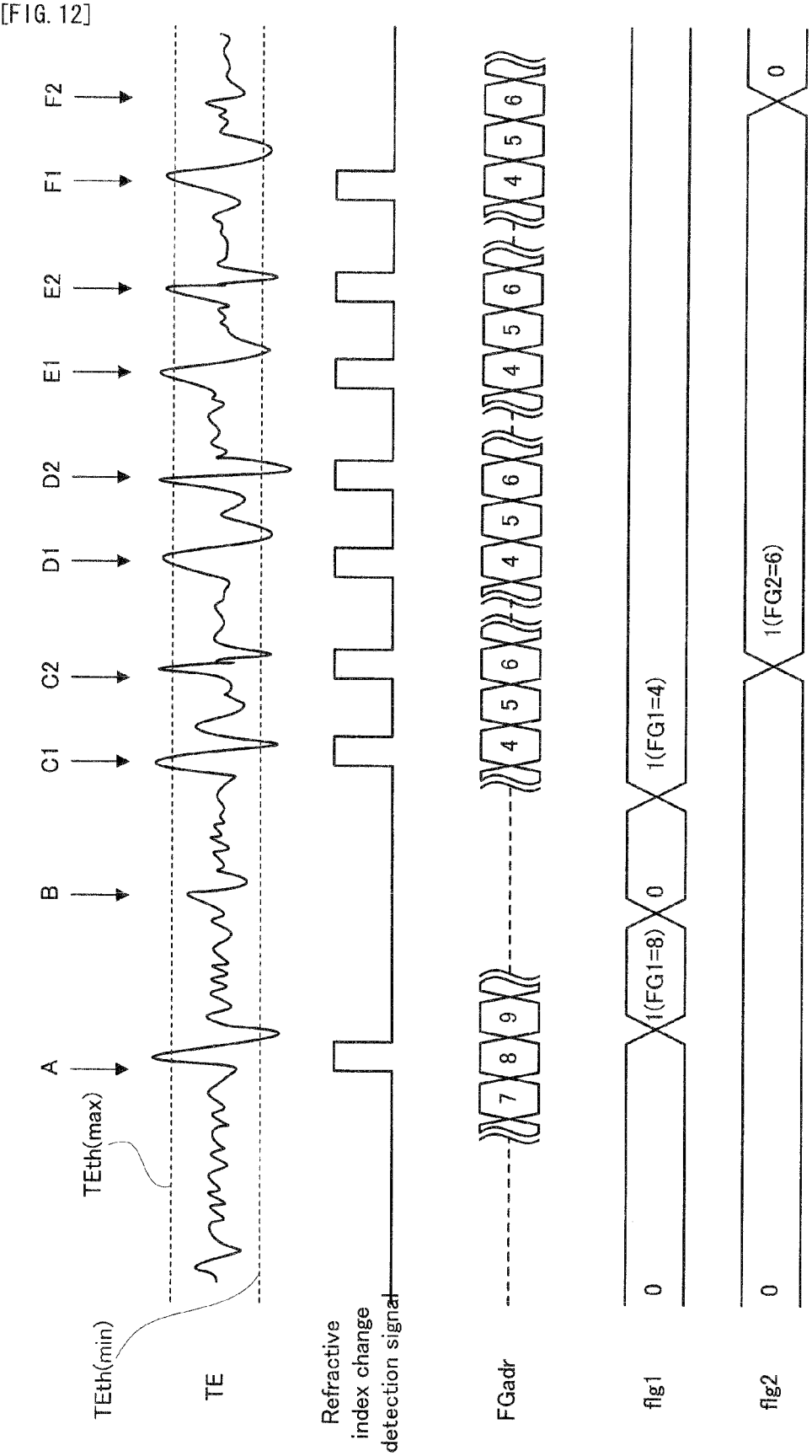
[FIG. 12]

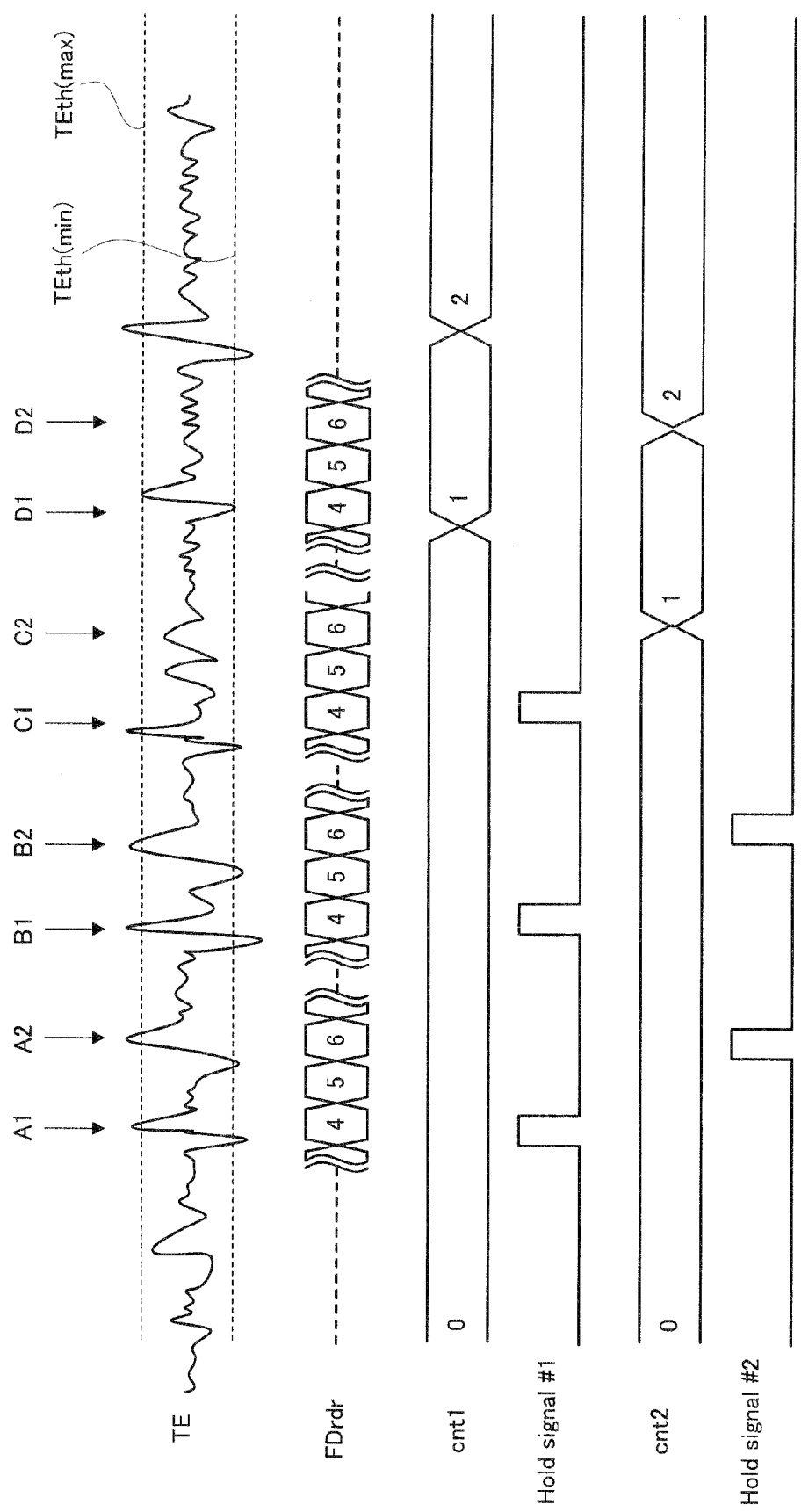
[FIG. 13]

[FIG. 14]
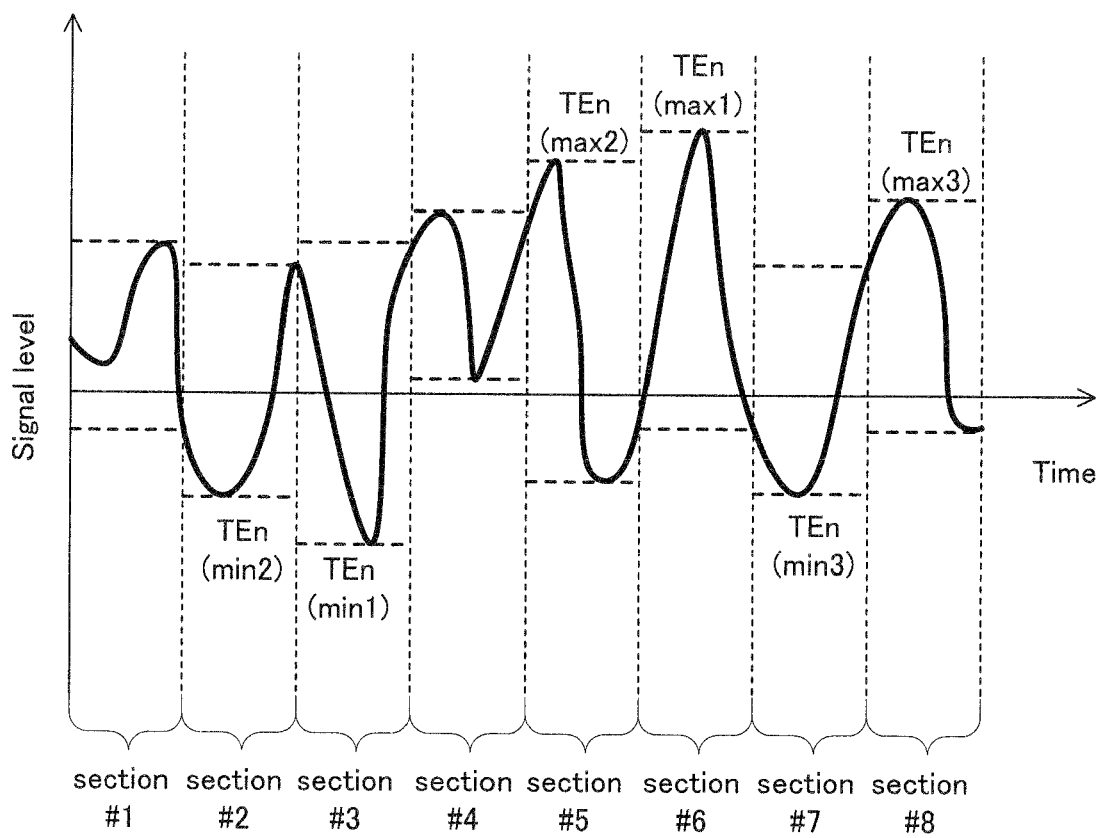

INFORMATION RECORDING APPARATUS AND METHOD, INFORMATION REPRODUCING APPARATUS AND METHOD, AND COMPUTER PROGRAM

TECHNICAL FIELD

The present invention relates to an information recording apparatus and method, such as a DVD recorder, an information reproducing apparatus and method, such as a DVD player, and a computer program which makes a computer function as such an information recording apparatus or information reproducing apparatus.

BACKGROUND ART

An information recording medium including a CD, a DVD, and the like has become popular. Such an information recording medium has a recording film, such as an organic dye film and a phase change film, formed on a substrate by spin coating or the like, and a light transmissive film with a thickness of 0.6 mm to 1.2 mm formed on the recording film by the spin coating or the like.

In recording data onto the information recording medium, tracking control is performed in order to irradiate a laser beam at a preferable position. The tracking control is performed to irradiate the laser beam substantially near the center of a recording track. More specifically, the tracking control is performed on the basis of a push-pull signal, which indicates a difference between a right-side signal component and a left-side signal component of reflected light of the laser beam, with respect to a recording direction.

The tracking control needs to be performed preferably when a disturbance, such as an impact, is exerted on an information recording apparatus and even when there is a defect, such as a scratch and dusts, on the surface of the information recording medium. For example, when the disturbance is exerted, a tracking error signal used for the tracking control is significantly deteriorated, so the tracking control is performed according to the deterioration (in other words, so as to eliminate the deterioration). When there is the defect, although the laser light is irradiated near the center of the recording track, the tracking error signal is significantly deteriorated. Thus, with reference to a defect detection signal generated on the basis of a sum signal (or a RF signal), the tracking control is performed to hold tracking servo. As a method of performing the tracking control when there is such a disturbance and a defect, for example, methods in patent documents 1 and 2 are listed.

Patent document 1: Japanese Patent Application Laid Open NO. Hei 11-39678
Patent document 2: Japanese Patent Application Laid Open NO. Hei 8-147721

DISCLOSURE OF INVENTION

Subject to be Solved by the Invention

On the other hand, the disadvantage such that a refractive index or the like of one portion of the light transmissive film changes unexpectedly may occur in some cases. As a cause for that, for example, it is considered that one portion of the light transmissive film turns into a gel because of some factors caused during or after manufacturing the information recording medium. Moreover, as another cause, it is considered that an air bubble with a size of several tens micrometers (hereinafter referred to as an "air bubble") is generated in some cases in the light transmissive film, depending on conditions in a manufacturing process. Even in the case that the refractive index or the like of one portion of the light transmissive film has changed, the aforementioned tracking control needs to be preferably performed, from the viewpoint of maintaining a preferable recording operation or reproduction operation.

On the other hand, a Blu-ray Disc has been developed, having a larger recording capacity than those of the CD and the DVD. The Blu-ray Disc uses an objective lens with a larger numeral aperture (NA) (specifically, with a NA of 0.85) to focus a blue laser beam on a recording surface of the information recording medium. Therefore, when the NA becomes larger, the influence of the dirt and the distortion on the Disc surface becomes larger, thereby the deterioration of the tracking error signal caused by the change in the refractive index or the like of one portion of the light transmissive film increases. However, the change in the refractive index or the like of one portion of the light transmissive film sometimes deteriorates the tracking error signal but does not have an effect on the sum signal. Thus, there is such a technical problem that the unexpected change in the refractive index or the like of one portion of the light transmissive film cannot be detected by the defect detection signal. In addition, the unexpected change in the refractive index or the like of one portion of the light transmissive film significantly deteriorates the tracking error signal although the laser beam is irradiated near the center of the recording track. Thus, if the tracking control is performed similarly to the case that the disturbance is exerted, there is such a technical problem that the laser beam is likely irradiated on a recording track except the recording track that is originally to be irradiated with the laser beam. In short, there is such a technical problem that it cannot be identified that the deterioration of the tracking error signal is caused by the unexpected change in the refractive index or the like of one portion of the light transmissive film.

It is therefore an object of the present invention to provide an information recording apparatus and method, and an information reproducing apparatus and method, which enable the cause of the deterioration of the tracking error signal to be preferably identified, and a computer program which makes a computer function as such an information recording apparatus or information reproducing apparatus.

Means for Solving the Subject

The above object of the present invention can be achieved by an information recording apparatus provided with: a first judging device for judging whether or not an absolute value of a tracking error signal is greater than or equal to a predetermined first threshold value; a detecting device for detecting, as a detection angle, a rotation angle of an information recording medium when it is judged that the absolute value of the tracking error signal is greater than or equal to the first threshold value; and a second judging device for judging whether or not the judgment that the absolute value of the tracking error signal is greater than or equal to the first threshold value is performed at the same detection angle.

The above object of the present invention can be also achieved by an information recording method provided with: a first judging process of judging whether or not an absolute value of a tracking error signal is greater than or equal to a predetermined first threshold value; a detecting process of detecting, as a detection angle, a rotation angle of an information recording medium when it is judged that the absolute value of the tracking error signal is greater than or equal to the first threshold value; and a second judging process of judging whether or not the judgment that the absolute value of the tracking error signal is greater than or equal to the first threshold value is performed at the same detection angle.

The above object of the present invention can be also achieved by an information reproducing apparatus provided with: a first judging device for judging whether or not an absolute value of a tracking error signal is greater than or equal to a predetermined first threshold value; a detecting device for detecting, as a detection angle, a rotation angle of an information recording medium when it is judged that the absolute value of the tracking error signal is greater than or equal to the first threshold value; and a second judging device for judging whether or not the judgment that the absolute value of the tracking error signal is greater than or equal to the first threshold value is performed at the same detection angle.

The above object of the present invention can be also achieved by an information reproducing method provided with: a first judging process of judging whether or not an absolute value of a tracking error signal is greater than or equal to a predetermined first threshold value; a detecting process of detecting, as a detection angle, a rotation angle of an information recording medium when it is judged that the absolute value of the tracking error signal is greater than or equal to the first threshold value; and a second judging process of judging whether or not the judgment that the absolute value of the tracking error signal is greater than or equal to the first threshold value is performed at the same detection angle.

The above object of the present invention can be also achieved by a first computer program for recording control and for controlling a computer provided in the information recording apparatus of the present invention, the computer program making the computer function as at least one portion of the first judging device, the detecting device, and the second judging device.

The above object of the present invention can be also achieved by a second computer program for reproduction control and for controlling a computer provided in the information reproducing apparatus of the present invention, the computer program making the computer function as at least one portion of the first judging device, the detecting device, and the second judging device.

These effects and other advantages of the present invention will become more apparent from the embodiments explained below.

BRIEF DESCRIPTION OF DRAWINGS

FIG. 1 is a block diagram conceptually showing the basic structure of an information recording/reproducing apparatus in an example.

FIG. 2 is a cross sectional view conceptually showing an optical disc 100 loaded onto the information recording/reproducing apparatus in the example.

FIG. 3 are cross sectional views conceptually showing a state in which a refractive index of one portion of a light transmissive film of the optical disc in the example has changed unexpectedly.

FIG. 4 is a flowchart conceptually showing a flow of the recording operation of the information recording/reproducing apparatus in the example.

FIG. 5 is a flowchart conceptually showing a flow of an "operation of detecting the deterioration of a tracking error signal TE caused by the unexpected change in the refractive index" of the recording operation of the information recording/reproducing apparatus in the example.

FIG. 6 is a graph conceptually showing a threshold value of the tracking error signal.

FIG. 8 is a flowchart conceptually showing another flow of the "operation of detecting the deterioration of the tracking error signal TE caused by the unexpected change in the refractive index" of the recording operation of the information recording/reproducing apparatus in the example.

FIG. 9 is a flowchart conceptually showing a flow of an "operation of holding tracking servo in a position in which the deterioration of the tracking error signal is generated by the unexpected change in the refractive index" of the recording operation of the information recording/reproducing apparatus in the example.

FIG. 10 is a timing chart conceptually showing, along a time axis, each of the tracking error signal TE and a tracking servo control signal used in the information recording/reproducing apparatus in the example, in the "operation of holding tracking servo in the position in which the deterioration of the tracking error signal is generated by the unexpected change in the refractive index".

FIG. 11 is a timing chart conceptually showing, along a time axis, various control signals used in the information recording/reproducing apparatus in the example, in the "operation of holding tracking servo in the position in which the deterioration of the tracking error signal is generated by the unexpected change in the refractive index".

FIG. 12 is a timing chart conceptually showing, along a time axis, various control signals used in the information recording/reproducing apparatus in the example, when the plurality of the "operations of detecting the deterioration of the tracking error signal TE caused by the unexpected change in the refractive index" are performed simultaneously.

FIG. 13 is a timing chart conceptually showing, along a time axis, various control signals used in the information recording/reproducing apparatus in the example, when the plurality of the "operations of holding tracking servo in the position in which the deterioration of the tracking error signal is generated by the unexpected change in the refractive index" are performed simultaneously.

FIG. 14 is a graph conceptually showing another threshold value of the tracking error signal.

Figure 7:
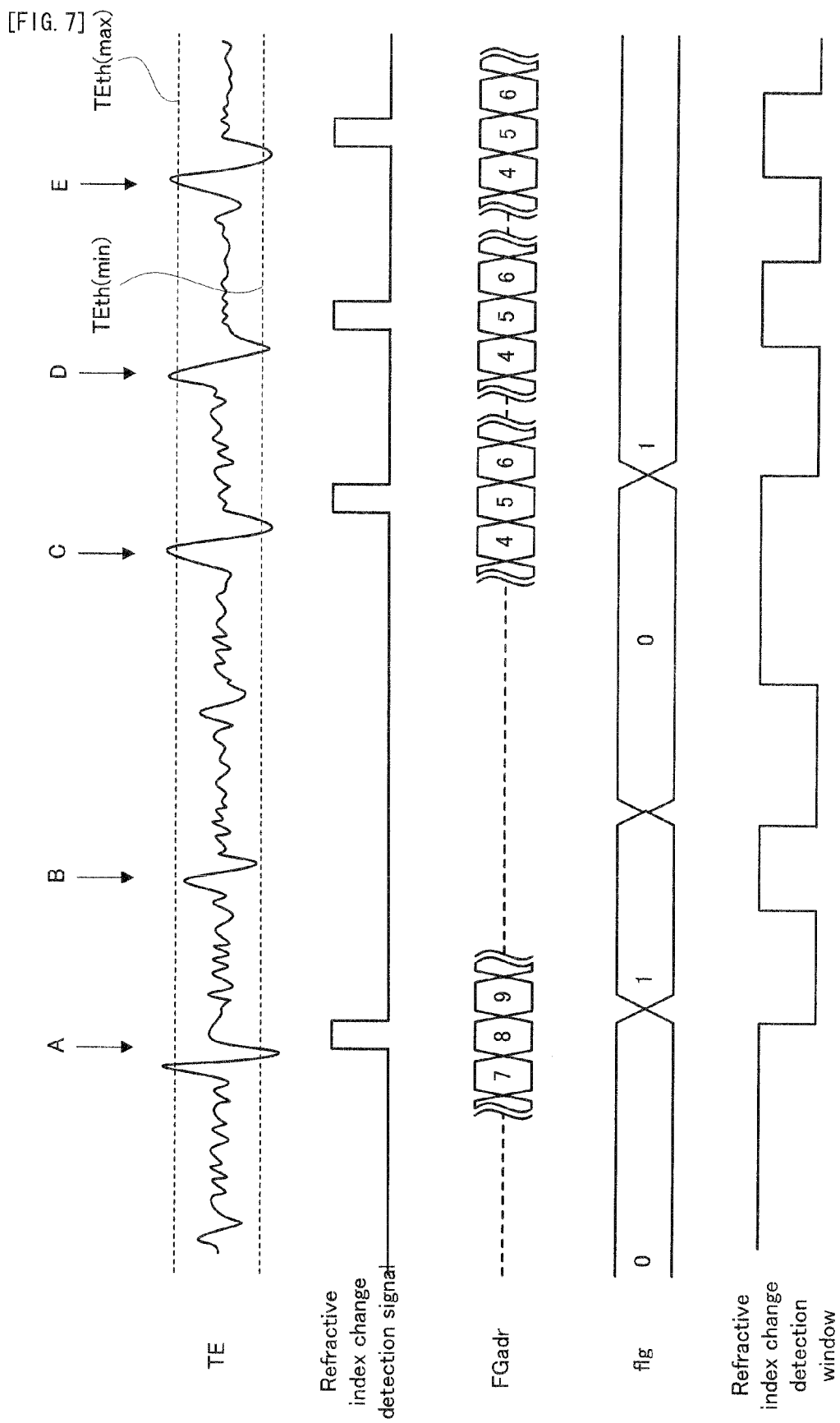
FIG. 7 is a timing chart conceptually showing, along a time axis, various control signals used in the information recording/reproducing apparatus in the example, in the "operation of detecting the deterioration of the tracking error signal caused by the unexpected change in the refractive index".

DESCRIPTION OF REFERENCE CODES 1 information recording/reproducing apparatus
11 spindle motor
12 optical pickup
13 driver
14 recording circuit
15 FG generation circuit
16 RF amplifier
17 DSP
18 decoder
19 microcomputer
191 first judgment circuit
192 rotation angle detection circuit
193 second judgment circuit
194 hold circuit
195 stop circuit
20 counter circuit
21 flag circuit
22 memory
100 optical disc
140 air bubble 150 gel portion
TE tracking error signal
TEth threshold value

BEST MODE FOR CARRYING OUT THE INVENTION

Hereinafter, a description will be given in order on the information recording apparatus and method, and the computer program in embodiments of the present invention as the best mode for carrying out the present invention.

(Embodiment of Information Recording Apparatus)

An embodiment of the information recording apparatus of the present invention is provided with: a first judging device for judging whether or not an absolute value of a tracking error signal is greater than or equal to a predetermined first threshold value (in other words, whether or not the tracking error signal is deteriorated); a detecting device for detecting, as a detection angle, a rotation angle of an information recording medium when it is judged that the absolute value of the tracking error signal is greater than or equal to the first threshold value; and a second judging device for judging whether or not the judgment that the absolute value of the tracking error signal is greater than or equal to the first threshold value is performed at the same detection angle.

According to the embodiment of the information recording apparatus of the present invention, by the operation of the first judging device, it is judged whether or not the absolute value of the tracking error signal used in performing the tracking control is greater than or equal to the predetermined first threshold value. Then, if it is judged by the first judging device that the absolute value of the tracking error signal is greater than or equal to the first threshold value, the rotation angle of the information recording medium when the judgment is performed is detected by the operation of the detecting device, as the detection angle.

After that, by the operation of the second judging device, it is judged whether or not the judgment that the absolute value of the tracking error signal is greater than or equal to the first threshold value is performed, at the same detection angle. More specifically, it is judged whether or not the judgment that the absolute value of the tracking error signal is greater than or equal to the first threshold value is performed, at the rotation angle that is once detected as the detection angle, after the information recording medium rotates one time.

As a result, if it is judged that the judgment that the absolute value of the tracking error signal is greater than or equal to the first threshold value is performed, at the same detection angle, it can be judged that a laser beam is irradiated through a light transmissive film in which there is an unexpected change in a refractive index and which is formed in a recording area at a certain rotation angle on the information recording medium every time the information recording medium rotates. By this, it can be recognized that the tracking error signal is generated because of the light transmissive film in which there is the unexpected change in the refractive index (e.g. a gel-like light transmissive film, an air bubble, or the like) and which is formed in a predetermined recording area on the information recording medium.

On the other hand, if it is judged that the judgment that the absolute value of the tracking error signal is greater than or equal to the first threshold value is not performed, at the same detection angle, it can be judged that the tracking error signal at the detection angle happens to have a value that is greater than or equal to the first threshold value from an influence of a disturbance or the like. By this, it can be recognized that the tracking error signal is generated because of the disturbance, such as an impact, exerted on the information recording apparatus.

As described above, according to the embodiment, it is possible to preferably identify the cause of the deterioration of the tracking error signal (i.e. that the absolute value of the tracking error signal becomes the first threshold value or more). More specifically, it is possible to preferably identify whether the deterioration of the tracking error signal is caused by the unexpected change in the refractive index or by the disturbance. Moreover, because the cause of the deterioration of the tracking error signal can be preferably identified, it is possible to perform the preferable tracking control according to the cause, as described later.

Incidentally, the above description explains the case that one detection angle is detected in a certain recording track. However, if two or more detection angles are detected in the certain recording track (i.e. if it is judged that the absolute value of the tracking error signal is greater than or equal to the first threshold value, at a first rotation angle and at a second rotation angle in the certain recording track), the judgment by the second judging device is preferably performed in parallel on each of the detection angles, independently of the other detection angle.

In one aspect of the embodiment of the information recording apparatus of the present invention, the information recording medium is provided with a spiral or concentric recording track, and the second judging device judges whether or not the judgment that the absolute value of the tracking error signal is greater than or equal to the first threshold value is performed at the detection angle on the recording track adjacent to the recording track in which it is judged that the absolute value of the tracking error signal is greater than or equal to the first threshold value.

According to this aspect, it is judged whether or not the judgment that the absolute value of the tracking error signal is greater than or equal to the first threshold value is performed, at the rotation angle that is once detected as the detection angle, every time the information recording medium rotates one time. That is, if a certain rotation angle on a first recording track is detected as the detection angle, it is judged whether or not the judgment that the absolute value of the tracking error signal is greater than or equal to the first threshold value is performed, at the detection angle on a second recording track adjacent to the first recording track. After that, it is judged whether or not the judgment that the absolute value of the tracking error signal is greater than or equal to the first threshold value is performed, at the detection angle on an n+1 recording track adjacent to an n recording track (wherein n is an integer of 2 or more) while n is incremented, as occasion demands.

By this, it is possible to preferably identify whether the deterioration of the tracking error signal is caused by the unexpected change in the refractive index or by the disturbance.

In another aspect of the embodiment of the information recording apparatus of the present invention, it is further provided with: a first flag device for setting a detection flag to a valid value (e.g. a flag "1") when it is judged that the absolute value of the tracking error signal is greater than or equal to the first threshold value, at the detection angle; a second flag device for setting the detection flag to an invalid value (e.g. a flag "0") when it is judged that the absolute value of the tracking error signal is not greater than nor equal to the first threshold value, at the detection angle; and the second judging device judging whether or not the judgment that the absolute value of the tracking error signal is greater than or equal to the first threshold value is performed when the detection flag is set to the valid value.

According to this aspect, the judgment by the second judging device can be preferably performed using the detection flag.

At this time, the first controlling device may control the first incrementing device to increment the first count value if it is judged that the absolute value of the tracking error signal is greater than or equal to the first threshold value, at the detection angle until the information recording medium rotates l times (wherein l is an integer of 1 or more) after it is judged that the tracking error signal is greater than or equal to the first threshold value.

In another aspect of the embodiment of the information recording apparatus of the present invention, the first judging device judges whether or not the absolute value of the tracking error signal is greater than or equal to the first threshold value if a defect detection signal is at a low level, the defect detection signal indicating presence or absence of a defect on the information recording medium.

According to this aspect, it is possible to preferably identify whether the deterioration of the tracking error signal is caused by the unexpected change in the refractive index or by the disturbance, or by the defect, such as a scratch and dusts, on the information recording medium. More specifically, if the defect detection signal is at a high level, it can be identified that the deterioration of the tracking error signal is caused by the defect, and if the defect detection signal is at a low level, it can be identified that the deterioration of the tracking error signal is caused by the unexpected change in the refractive index or the disturbance, in the aforementioned method.

In another aspect of the embodiment of the information recording apparatus of the present invention, the first threshold value is at least one of an average value between a maximum value that can be taken by the tracking error signal and a maximum value of a remaining component of the tracking error signal, and an average value between a minimum value that can be taken by the tracking error signal and a minimum value of the remaining component of the tracking error signal.

According to this aspect, the judgment by the first judging device can be performed preferably or highly accurately.

In another aspect of the embodiment of the information recording apparatus of the present invention, the first threshold value is at least one of an average value between an at least second or more largest maximum value of maximum values in a plurality of sampling sections when the tracking error signal is divided by the plurality of sampling sections and an at least second or more largest maximum value of maximum values in a plurality of sampling sections when a remaining component of the tracking error signal is divided by the plurality of sampling sections, and an average value between an at least second or more smallest minimum value of minimum values in the plurality of sampling sections and an at least second or more smallest minimum value of minimum values in the plurality of sampling sections.

According to this aspect, the judgment by the first judging device can be performed preferably or highly accurately.

In another aspect of the embodiment of the information recording apparatus of the present invention, it is further provided with a holding device for holding tracking servo near the detection angle if it is judged by the second judging device that the judgment that the absolute value of the tracking error signal is greater than or equal to the first threshold value is performed, at the same detection angle.

According to this aspect, without being influenced by the deterioration of the tracking error signal caused by the unexpected change in the refractive index, the tracking control can be preferably performed even in the recording area at which there is the unexpected change in the refractive index.

In an aspect of the information recording apparatus provided with the holding device, as described above, the holding device may hold the tracking servo if it is judged that the absolute value of the tracking error signal is greater than or equal to the first threshold value, near the detection angle.

By virtue of such construction, without being influenced by the deterioration of the tracking error signal caused by the unexpected change in the refractive index, the tracking control can be preferably performed even in the recording area at which there is the unexpected change in the refractive index.

In an aspect of the information recording apparatus provided with the holding device, as described above, it is further provided with a stopping device for stopping the hold of the tracking servo if it is judged by the second judging device that the judgment that the absolute value of the tracking error signal is not greater than nor equal to the first threshold value is performed, at the same detection angle.

By virtue of such construction, the tracking control can be preferably performed even in the recording area at which there is the unexpected change in the refractive index, and the tracking control can be also preferably performed even in the recording area at which there is not the unexpected change in the refractive index.

In an aspect of the information recording apparatus provided with the stopping device, as described above, it may be further provided with: an incrementing device for incrementing a count value; a controlling device for controlling the incrementing device to increment the count value if it is judged the absolute value of the tracking error signal is not greater than nor equal to the first threshold value, near the detection angle; and a setting device for setting the count value to an initial value if it is judged that the absolute value of the tracking error signal is greater than or equal to the first threshold value, near the detection angle, the stopping device stopping the hold of the tracking servo if the count value is greater than or equal to a predetermined second threshold value.

By virtue of such construction, by using the count value, it is possible to preferably change whether to hold the tracking servo or to stop the hold of the tracking servo.

(Embodiment of Information Recording Method)

An embodiment of the information recording method of the present invention is provided with: a first judging process of judging whether or not an absolute value of a tracking error signal is greater than or equal to a predetermined first threshold value; a detecting process of detecting, as a detection angle, a rotation angle of an information recording medium when it is judged that the absolute value of the tracking error signal is greater than or equal to the first threshold value; and a second judging process of judging whether or not the judgment that the absolute value of the tracking error signal is greater than or equal to the first threshold value is performed at the same detection angle.

According to the embodiment of the information recording method of the present invention, it is possible to receive various benefits of the aforementioned embodiment of the information recording apparatus of the present invention.

In response to the various aspects of the aforementioned embodiment of the information recording apparatus of the present invention, the embodiment of the information recording method of the present invention can employ various aspects.

(Embodiment of Information Reproducing Apparatus)

An embodiment of the information reproducing apparatus is provided with: a first judging device for judging whether or not an absolute value of a tracking error signal is greater than or equal to a predetermined first threshold value (in other words, whether or not the tracking error signal is deteriorated); a detecting device for detecting, as a detection angle, a rotation angle of an information recording medium when it is judged that the absolute value of the tracking error signal is greater than or equal to the first threshold value; and a second judging device for judging whether or not the judgment that the absolute value of the tracking error signal is greater than or equal to the first threshold value is performed at the same detection angle.

According to the embodiment of the information reproducing apparatus of the present invention, it is possible to receive various benefits of the aforementioned embodiment of the information recording apparatus of the present invention.

In response to the various aspects of the aforementioned embodiment of the information recording apparatus of the present invention, the embodiment of the information reproducing apparatus of the present invention can employ various aspects.

(Embodiment of Information Reproducing Method)

An embodiment of the information reproducing method is provided with: a first judging process of judging whether or not an absolute value of a tracking error signal is greater than or equal to a predetermined first threshold value; a detecting process of detecting, as a detection angle, a rotation angle of an information recording medium when it is judged that the absolute value of the tracking error signal is greater than or equal to the first threshold value; and a second judging process of judging whether or not the judgment that the absolute value of the tracking error signal is greater than or equal to the first threshold value is performed at the same detection angle.

According to the embodiment of the information reproducing method of the present invention, it is possible to receive various benefits of the aforementioned embodiment of the information recording apparatus of the present invention.

In response to the various aspects of the aforementioned embodiment of the information recording apparatus of the present invention, the embodiment of the information reproducing method of the present invention can employ various aspects.

(Embodiment Computer Program)

A first embodiment of the computer program of the present invention is a computer program for recording control and for controlling a computer provided in the aforementioned information recording apparatus of the present invention (including its various aspects), the computer program making the computer function as at least one portion of the first judging device, the detecting device, and the second judging device.

According to the first embodiment of the computer program of the present invention, the aforementioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned embodiment of the information recording apparatus of the present invention, the first embodiment of the computer program of the present invention can also employ various aspects.

A second embodiment of the computer program of the present invention is a computer program for reproduction control and for controlling a computer provided in the aforementioned information reproducing apparatus of the present invention (including its various aspects), the computer program making the computer function as at least one portion of the first judging device, the detecting device, and the second judging device.

According to the second embodiment of the computer program of the present invention, the aforementioned embodiment of the information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned embodiment of the information reproducing apparatus of the present invention, the second embodiment of the computer program of the present invention can also employ various aspects.

The above object of the present invention can be also achieved by a first embodiment of a computer program product in a computer-readable medium for tangibly embodying a program of instructions executable by a computer provided in the aforementioned information recording apparatus of the present invention (including its various aspects), the computer program product making the computer function as at least one portion of the first judging device, the detecting device, and the second judging device.

According to the first embodiment of the computer program product of the present invention, the aforementioned embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information recording apparatus of the present invention.

Incidentally, in response to the various aspects of the aforementioned embodiment of the information recording apparatus of the present invention, the first embodiment of the computer program product of the present invention can also employ various aspects.

The above object of the present invention can be also achieved by a second embodiment of a computer program product in a computer-readable medium for tangibly embodying a program of instructions executable by a computer provided in the aforementioned information reproducing apparatus of the present invention (including its various aspects), the computer program product making the computer function as at least one portion of the first judging device, the detecting device, and the second judging device.

According to the second embodiment of the computer program product of the present invention, the aforementioned embodiment of the information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the information reproducing apparatus of the present invention.

Incidentally, in response to the various aspects of the aforementioned embodiment of the information reproducing apparatus of the present invention, the second embodiment of the computer program product of the present invention can also employ various aspects.

These effects and other advantages of the present invention will become more apparent from the embodiment explained below.

As explained above, according to the information recording apparatus of the present invention, it is provided with the first judging device, the detecting device, and the second judging device. According to the information recording method of the present invention, it is provided with the first judging process, the detecting process, and the second judging process. According to the information reproducing apparatus of the present invention, it is provided with the first judging device, the detecting device, and the second judging device. According to the information reproducing method of the present invention, it is provided with the first judging process, the detecting process, and the second judging process. Therefore, it is possible to preferably identify the cause of the deterioration of the tracking error signal.

Example

Hereinafter an example of the present invention will be explained with reference to the drawings.

(Basic Structure)

Firstly, with reference to FIG. 1, a description will be given on the basic structure of an information recording/reproducing apparatus, which is an example of the information recording apparatus and the information reproducing apparatus of the present invention. FIG. 1 is a block diagram conceptually showing the basic structure of an information recording/reproducing apparatus in an example. Incidentally, an information recording/reproducing apparatus 1 has both a function of recording data onto an optical disc 100 and a function of reproducing the data recorded on the optical disc 100.

As shown in FIG. 1, the information recording/reproducing apparatus 1 in the example is provided with: a spindle motor 11; an optical pickup 12; a driver 13; a recording circuit 14; a FG generation circuit 15; a RF (Radio Frequency) amplifier 16; a DSP (Digital Signal Processor) 17; a decoder 18; a microcomputer 19; a counter circuit 20; a flag circuit 21; and a memory 22.

The spindle motor 11 is intended to rotate and stop the optical disc 100 and operates in accessing the optical disc 100. More specifically, the spindle motor 11 is adapted to rotate the optical disc 100 at a predetermined speed and stop it under spindle servo outputted from the driver 13.

The optical pickup 12 is provided with a semiconductor laser diode; an objective lens; and the like, in order to record data onto the optical disc 100 and reproduce the data recorded on the optical disc 100. More specifically, if recording the data onto the optical disc 100, the optical pickup 12 irradiates the optical disc 100 with a laser beam LB which has a relatively large first power and which is modulated on the basis of a strategy signal outputted from the driver 13. On the other hand, if reproducing the data recorded on the optical disc 100, the optical pickup 12 irradiates the optical disc 100 with the laser beam LB which has a relatively small second power.

Moreover, the optical pickup 12 is provided with a four-division detection circuit in which a light receiving area is divided into four areas of A, B, C, and D. On the basis of the reflected light of the received laser beam LB, the optical pickup 12 supplies the RF amplifier 16 with a RF signal, which is the sum of the intensities of the reflected lights received in the respective four light receiving areas (i.e. A+B+C+D), and supplies the driver 13 with a tracking error signal TE, which is a difference between the sum of the intensities of the reflected lights received in the respective A and D of the four light receiving areas and the sum of the intensities of the reflected lights received in the respective B and D of the four light receiving areas.

The driver 13 supplies the spindle motor 11 with a spindle servo control signal and operates the spindle motor 11, under the control of the microcomputer 19. Moreover, the driver 13 generates a tracking servo control signal on the basis of the tracking error signal TE and supplies the tracking servo control signal to the optical pickup 12, to thereby perform the tracking control of the optical pickup 12, under the control of the microcomputer 19. Moreover, the driver 13 generates a focus servo control signal on the basis of a focus error signal and supplies the focus servo control signal to the optical pickup 12, to thereby perform focus control of the optical pickup 12, under the control of the microcomputer 19. Moreover, the driver 13 supplies the optical pickup 12 with a laser driving signal which defines the waveform of the laser beam LB irradiated from the optical pickup 12, on the basis of a record signal supplied from the recording circuit 14, to thereby drive the semiconductor laser apparatus disposed in the optical pickup 12.

The recording circuit 14 performs a modulation process, a coding process, an error correction code appending process, and the like on video data, audio data, and other various data supplied from the exterior of the information recording/reproducing apparatus 1, to thereby generate the record signal. The generated record signal is outputted to the driver 13, and the driver 13 drives the semiconductor laser apparatus disposed in the optical pickup 12, on the basis of the record signal.

The FG generation circuit 15 generates a cycle detection signal (hereinafter referred to as a "FG signal" and outputs it to the DSP 17 every time the optical disc 100 rotates by a certain angle. More specifically, the FG generation circuit 15 may be constructed to generate the cycle detection signal every time the optical disc 100 rotates, for example, 10 degrees. At this time, it is preferable to generate the FG signal with an identification code corresponding to the rotation angle of the optical disc 100 with respect to a predetermined reference position. For example, if the rotation angle of the optical disc 100 is 0 to 10 degrees, it is preferable to generate the FG signal with an identification code of #1, if 10 to 20 degrees, the FG signal with an identification code of #2, and if 10×(r−1) to 10×r degrees, the FG signal with an identification code of #r. In this case, it is recognized that the optical disc 100 rotates one time when the cycle detection signal is detected 36 times.

The RF amplifier 16 amplifies the output signal of the optical pickup 12, i.e. the reflected light of the laser beam LB, and outputs the amplified signal to the DSP 17.

The DSP 17 performs a digital signal process on the signal outputted from the RF amplifier 16 and the signal outputted from the FG generation circuit 15, under the control of the microcomputer 19. In performing the digital signal process, the DSP 17 exchanges data with various function blocks in the microcomputer 19 described later, as occasion demands.

The decoder 18 performs a decoding process on the signal on which the digital signal process is performed by the DSP 17 (in particular, the signal outputted from the RF amplifier 16), to thereby generate the video data, the audio data, and the other various data. The video data, the audio data, and the other various data which is generated are outputted to external output equipment, such as a display and a speaker, and are reproduced as video images and sounds.

The microcomputer 19 is connected through a data bus to the driver 13, the recording circuit 14, the DSP 17, the decoder 18, the counter circuit 20, the flag circuit 21, the memory 22 and the like, and gives instructions to them to thereby control the entire information recording/reproducing apparatus 1. Typically, software or firmware for operating the microcomputer 19 is stored in the memory 22.

In particular, the information recording/reproducing apparatus 1 in the example is provided, in the micro computer 19, with: a first judgment circuit 191; a rotation angle detection circuit 192; a second judgment circuit 193; a hold circuit 194; and a stop circuit 195, as function blocks which are realized by the operation of a program.

The first judgment circuit 191 constitutes one specific example of the "first judging device" of the present invention. The first judgment circuit 191 is adapted to judge whether or not the tracking error signal TE is greater than or equal to a threshold value TEth determined in advance or determined as occasion demands. A result of the judgment is outputted to the detection circuit 192 and the second judgment circuit 193.

The rotation angle detection circuit 192 constitutes one specific example of the "detecting device" of the present invention. The rotation angle detection circuit 192 is adapted to detect the rotation angle of the optical disc 100 on the basis of the FG signal outputted from the FG generation circuit 15. In particular, the rotation angle detection circuit 192 is adapted to detect, as a detection angle, the rotation angle of the optical disc 100 when it is judged by the first judgment circuit 191 that the tracking error signal TE is greater than or equal to a threshold value TEth determined in advance or determined as occasion demands. The detection angle is outputted to the second judgment circuit 193.

The second judgment circuit 193 constitutes one specific example of the "second judging device" of the present invention. The second judgment circuit 193 is adapted to judge whether or not the tracking error signal TE is greater than or equal to a threshold value TEth determined in advance or determined as occasion demands, at the detection angle that the optical disc 100 passes through in each one rotation. A result of the judgment by the second judgment circuit 193 is outputted to the hold circuit 194 and the stop circuit 195.

The hold circuit 194 constitutes one specific example of the "holding device" of the present invention. The hold circuit 194 is adapted to output, to the driver 13, an instruction indicating to hold the tracking servo near the detection angle if it is judged by the second judgment circuit 193 that the first judgment circuit 192 judges that the tracking error signal TE is greater than or equal to a threshold value TEth determined in advance or determined as occasion demands, at the same detection angle. That is, the instruction indicating to hold the tracking servo by the hold circuit 194 is given to the driver 13, and the driver 13 performs the tracking control while holding the tracking servo.

The stop circuit 195 constitutes one specific example of the "stopping device" of the present invention. The stop circuit 195 is adapted to output the instruction indicating to stop the holding of the tracking servo, to the driver 13. That is, when the instruction indicating to hold the tracking servo by the hold circuit 194 is given to the driver 13, if the instruction indicating to stop the holding of the tracking servo is given from the stop circuit 195 to the driver 13, the driver 13 stops the holding of the tracking servo and performs normal tracking control.

Incidentally, a detailed description will be given later on more specific operations of the first judgment circuit 191, the rotation angle detection circuit 192, the second judgment circuit 193, the hold circuit 194, and the stop circuit 195 described above (refer to FIG. 3 to FIG. 10).

The counter circuit 20 constitutes one specific example of the "incrementing device", the "controlling device", and the "setting device", of the present invention. The counter circuit 20 is adapted to increment, decrement, and reset a count value.

The flag circuit 21 constitutes one specific example of the "first flag device" and the "second flag device" of the present invention, and it is adapted to change a flag value.

The memory 22 is used in the general data processing of the information recording/reproducing apparatus 1. More specifically, the memory 22 is provided with: a ROM area in which various programs (i.e. firmware) required for the operations of the information recording/reproducing apparatus 1 are stored; a buffer for temporarily storing the data; a RAM area in which a parameter required for the operation of the firmware program or the like is stored; and the like.

Now, with reference to FIG. 2 and FIG. 3, a description will be given on the optical disc 100 loaded onto the information recording/reproducing apparatus 1 in the example. FIG. 2 is a cross sectional view conceptually showing the optical disc 100 loaded onto the information recording/reproducing apparatus in the example. FIG. 3 are cross sectional views conceptually showing a state in which a refractive index of one portion of the light transmissive film of the optical disc in the example has changed unexpectedly.

As shown in FIG. 2, the optical disc 100 has a recording film 120, such as an organic dye film and a phase change film, formed on a substrate 110 by using spin coating or the like, and a light transmissive film 130 formed on the recording film 120 by spin coating or the like.

The light transmissive film 130 is about 1.2 mm thick in the case of a CD, which is one specific example of the optical disc 100, about 0.6 mm thick in the case of a DVD, which is one specific example of the optical disc 100, and about 0.1 mm thick in the case of a Blu-ray Disc, which is one specific example of the optical disc 100.

As shown in FIG. 3(a), an air bubble 140 with a size of about several tens micrometers is generated in some cases in the light transmissive film 130, depending on conditions in a manufacturing process for the optical disc 100. The refractive index or the like with respect to the laser beam LB at a portion in which the air bubble 140 is formed is different from that at a portion in which the air bubble 140 is not formed. That is, a physical thickness at the portion in which the air bubble 140 is formed is the same as that at the portion in which the air bubble 140 is not formed, however, an optical thickness (i.e. optical distance) at the portion in which the air bubble 140 is formed is different from that at the portion in which the air bubble 140 is not formed. If the recording film 120 is irradiated with the laser beam LB through the air bubble 140, even if the laser beam LB is properly irradiated near the center of the recording track, the tracking error signal TE deteriorates because of the change in the refractive index or the like. On the other hand, a PE (Pull-in Error) signal does not deteriorate, which is a DC component of the RF signal. This stands out, particularly in the Blu-ray Disc, on which the objective lens with the relatively large numeric aperture is used to relatively reduce the distance between the objective lens and the surface of the optical disc 100.

As shown in FIG. 3(b), one portion of the light transmissive film 130 becomes a gel portion 150 in some cases, depending on the conditions in the manufacturing process for the optical disc 100 or an environment or the like after the manufacturing of the optical disc 100. Alternatively, as shown in FIG. 3(c), one portion of the light transmissive film 130 becomes the gel portion 150, and the gel portion 150 has a shape projecting from the surface of the optical disc 100 in some cases, depending on the conditions in the manufacturing process for the optical disc 100 or the environment or the like after the manufacturing of the optical disc 100. The refractive index or the like with respect to the laser beam LB at a portion in which the gel portion 150 is formed is different from that at a portion in which the gel portion 150 is not formed. That is, the physical thickness at the portion in which the air bubble 140 is formed is the same as that at the portion in which the air bubble 140 is not formed, however, the optical thickness (i.e. optical distance) at the portion in which the gel portion 150 is formed is different form that at the portion in which the gel portion 150 is not formed. Therefore, as in the case that the air bubble 140 is formed, if the recording film 120 is irradiated with the laser beam LB through the gel portion 150, even if the laser beam LB is properly irradiated near the center of the recording track, the tracking error signal TE deteriorates because of the change in the refractive index or the like. On the other hand, the PE (Pull-in Error) signal does not deteriorates, which is a DC component of the RF signal. This stands out, particularly in the Blu-ray Disc, on which the objective lens with the relatively large numeric aperture is used to relatively reduce the distance between the objective lens and the surface of the optical disc 100.

The situation that the refractive index or the like of one portion of the light transmissive film 130 is unexpectedly changed is also possibly caused by factors except the air bubble 140 and the gel portion 150 described above. If the refractive index or the like of one portion of the light transmissive film 130 has been unexpectedly changed, the tracking error signal TE deteriorates although the PE signal does not deteriorate, which makes it hard or impossible to perform the preferable tracking control.

Thus, the information recording/reproducing apparatus 1 in the example properly detects the portion in which the refractive index or the like is unexpectedly change, such as the air bubble 140 and the gel portion 150, and properly performs the tracking control without being influenced by the deterioration of the tracking error signal TE by the unexpected change in the refractive index or the like. Hereinafter, a more detailed description will be given on the operations of the information recording/reproducing apparatus 1.

(Operation Principle)

Next, with reference to FIG. 4 to FIG. 13, the operation principle of the information recording/reproducing apparatus 1 in the example will be discussed.

(1) Recording Operation

Firstly, with reference to FIG. 4, a description will be given on a flow of the recording operation of the information recording/reproducing apparatus 1 in the example. FIG. 4 is a flowchart conceptually showing the flow of the recording operation of the information recording/reproducing apparatus 1 in the example.

As shown in FIG. 4, firstly, the optical disc 100 is loaded on the information recording/reproducing apparatus 1 (step S101).

Then, mainly by the operations of the first judgment circuit 191, the rotation angle detection circuit 192, and the second judgment circuit 193 or the like, the deterioration of the tracking error signal TE caused by the unexpected change in the refractive index is detected (step S102). Then, if the deterioration of the tracking error signal TE caused by the unexpected change in the refractive index is detected, the tracking servo is held in the position in which the tracking error signal TE deteriorates due to the unexpected change in the refractive index, mainly by the operations of the hold circuit 194 and the stop circuit 195 or the like (step S103).

Incidentally, a detailed description will be given later on an operation of detecting the deterioration of the tracking error signal TE caused by the unexpected change in the refractive index and an operation of holding the tracking servo in the position in which the tracking error signal TE deteriorates because of the unexpected change in the refractive index (refer to FIG. 5 to FIG. 8, and FIG. 9 to FIG. 13, respectively).

At this time, the operation of recording or reproducing the data on the optical disc 100 is simultaneously performed (step S104).

After that, it is judged whether or not the recording operation or reproduction operation is to be ended (step S105). For example, it is judged whether or not an instruction indicating to end the recording operation or reproduction operation is given by a user, or whether or not the recording of all the data to be recorded onto the optical disc 100 or the reproducing of all the data recorded onto the optical disc 100 is ended.

As a result of the judgment in the step S105, if it is judged that the recording operation or reproduction operation is to be ended (the step S105: Yes), the recording operation or reproduction operation is ended. At this time, a finalize process and an ejection process may be performed, if necessary.

On the other hand, as a result of the judgment in the step S105, if it is judged that the recording operation or reproduction operation is not to be ended (the step S105: No), the operational flow returns to the step S102 to the step S104 again, to continue the recording operation.

(2) Operation of Detecting Deterioration of Tracking Error Signal TE Caused by Unexpected Change in Refractive Index Next, with reference to FIG. 5 to FIG. 8, an explanation will be given on a flow of the "operation of detecting the deterioration of the tracking error signal TE caused by the unexpected change in the refractive index" of the recording operation of the information recording/reproducing apparatus 1 in the example. Incidentally, here, the flow of the detection operation will be discussed with reference to FIG. 5 and will be discussed in more detail with reference to FIG. 6 to FIG. 8, as occasion demands. FIG. 5 is a flowchart conceptually showing the flow of the "operation of detecting the deterioration of the tracking error signal TE caused by the unexpected change in the refractive index" of the recording operation of the information recording/reproducing apparatus 1 in the example.

As shown in FIG. 5, firstly, by the operation of the flag circuit 21, a flag flg is set to "0" (step S201).

Then, the threshold value TEth, used in detecting the deterioration of the tracking error signal TE, is set (step S202). The set threshold value TEth indicates the allowable range of the tracking error signal TE. For the allowable range, an upper limit threshold value TEth(max) and a lower limit threshold value TEth(min) are set. Specifically, if the tracking error signal TE is less than the upper limit threshold value TEth (max) and is greater than the lower limit threshold value TEth(min), it is judged that the tracking error signal does not deteriorate. On the other hand, if the tracking error signal TE is greater than or equal to the upper limit threshold value TEth(max) or is less than or equal to the lower limit threshold value TEth(min), it is judged that the tracking error signal deteriorates. The judgment is performed by the operation of the first judgment circuit 191.

Incidentally, in the example, the state that "the tracking error signal TE is greater than or equal to the threshold value TEth" is assumed to indicate the state that the tracking error signal TE is greater than or equal to the upper limit threshold value TEth(max) or is less than or equal to the lower limit threshold value TEth(min). On the other hand, the state that "the tracking error signal TE is not greater than nor equal to the threshold value TEth" is assumed to indicate the state that the tracking error signal TE is not greater than nor equal to the upper limit threshold value TEth(max) and is not less than nor equal to the lower limit threshold value TEth(min).

Now, with reference to FIG. 6, a description will be given on a method of setting the threshold value TEth (i.e. the upper limit threshold value TEth(max) and the lower limit threshold value TEth(min)). FIG. 6 is a graph conceptually showing the threshold value TEth of the tracking error signal TE.

As shown in FIG. 6, the tracking error signal TE includes a signal component that is too high-frequency to be followed by the tracking servo. The high-frequency signal component is referred to as a remaining component. For example, it is assumed that the remaining component of the tracking error signal TE obtained by rotating the optical disc 100 one time has a maximum value of TEn(max) and a minimum value of TEn(min).

Moreover, it is assumed that the tracking error signal TE has a maximum value of TE(max) and a minimum value of TE(min). The maximum value of TE(max) and the minimum value of TE(min) correspond respectively to the maximum value and the minimum value of the tracking error signal TE obtained in rotating the optical disc 100 at least one or more time(s), with the tracking servo open.

In the example, the upper limit threshold value TEth(max) is set to an average value of the maximum value TE(max) of the tracking error signal TE and the maximum value TEn(max) of the remaining component. That is, TEth(max)=(TE(max)+TEn(max))/2.

In the same manner, the lower limit threshold value TEth(min) is set to an average value of the minimum value TE(min) of the tracking error signal TE and the minimum value TEn(min) of the remaining component. That is, TEth(min)=(TE(min)+TEn(min))/2.

Of course, this method of setting the threshold value TEth is one specific example, and the threshold value may be determined by another setting method. The point is that it is only necessary to set the threshold value that allows the judgment of whether or not the tracking error signal deteriorates.

In FIG. 5 again, it is then judged whether or not a defect is detected between a predetermined period before and a current time (more specifically, while the optical disc 100 caracoles, while the optical disc 100 rotates at N degrees, or the like), under the control of the microcomputer 19 (step S203). The detection of the defect is performed on the basis of a defect detection signal. The defect detection signal reaches a high level if the PE signal, which is the DC component of the RF signal, is less than a certain value, and the defect detection signal reaches a low level if the PE signal, which is the DC component of the RF signal, is greater than or equal to the certain value. And, when the defect detection signal is at the high level, it is recognized that the defect is detected.

As a result of the judgment in the step S203, if it is judged that the defect is detected (the step S203: Yes), the operational flow returns to the step S201 while performing the tracking control which is performed when the defect is detected. More specifically, if the defect is detected, it is preferable to perform an operation of holding the tracking servo described later.

On the other hand, as a result of the judgment in the step S203, if it is judged that the defect is not detected (the step S203: No), then it is judged whether or not the tracking error signal TE is greater than or equal to the threshold value TEth (i.e. greater than or equal to the upper limit threshold value TEth(max) or is less than or equal to the lower limit threshold value TEth(min)), by the operation of the first judgment circuit 191 (step S204). That is, it is judged whether or not the tracking error signal deteriorates.

As a result of the judgment in the step S204, if it is judged that the tracking error signal TE is not greater than nor equal to the upper limit threshold value TEth(max) and is not less than nor equal to the lower limit threshold value TEth(min) (the step S204: No), it is considered that the tracking error signal TE does not deteriorate. Therefore, the operational flow returns to the step S203 to continue the processes in the step S203 and the step S204.

On the other hand, as a result of the judgment in the step S204, if it is judged that the tracking error signal TE is greater than or equal to the upper limit threshold value TEth(max) or is less than or equal to the lower limit threshold value TEth(min) (the step S204: Yes), it is considered that the tracking error signal TE deteriorates.

At this time, by the operation of the rotation angle detection circuit 192, a rotation angle FGadr of the optical disc 100 is detected at a time point at which it is judged that the tracking error signal TE is greater than or equal to the upper limit threshold value TEth(max) or is less than or equal to the lower limit threshold value TEth(min) (step S205). The rotation angle FGadr detected here may be the FG signal itself outputted from the FG generation circuit 15, or a numerical value which indicates the actual rotation angle.

After that, by the operation of the second judgment circuit 193, it is judged whether or not the flag flg has been set to "1" (step S206). In other words, it is judged whether or not it is judged, for the first time, that the tracking error signal TE is greater than or equal to the upper limit threshold value TEth(max) or is less than or equal to the lower limit threshold value TEth(min), at the rotation angle FGadr detected in the step S205. If it is judged, for the first time, that the tracking error signal TE is greater than or equal to the upper limit threshold value TEth(max) or is less than or equal to the lower limit threshold value TEth(min), at the rotation angle FGadr detected in the step S205, the flag flg has been set to "0". On the other hand, if it was also previously judged that the tracking error signal TE is greater than or equal to the upper limit threshold value TEth(max), or is less than or equal to the lower limit threshold value TEth(min), at the rotation angle FGadr detected in the step S205, the flag flg has been set to "1".

As a result of the judgment in the step S206, if it is judged that the flag flg has been set to "0" (the step S206: Yes), the flag flg is set to "1" by the operation of the flag circuit 21 (step S207). After that, the rotation angle FGadr detected in the step S205 is stored into a variable FG1 in the memory 22 (step S210). After that, the operational flow returns to the step S203 to continue the processes.

On the other hand, as a result of the judgment in the step S206, if it is judged that the flag flg has not been set to "0" (i.e. has been set to "1") (the step S206: No), it is judged whether or not the rotation angle FGadr detected in the step S205 has the same value as that of the variable FG1 in the memory 22 by the operation of the second judgment circuit 193 (step S207). That is, it is judged whether or not the previously detected rotation angle FGadr is the same as the rotation angle FGadr detected after the optical disc 100 rotates substantially one time. In other words, it is judged whether or not the rotation angle FGadr when it is judged that the tracking error signal TE is greater than or equal to the upper limit threshold value TEth(max) or is less than or equal to the lower limit threshold value TEth(min), is the same as the rotation angle FGadr when it is judged again that the tracking error signal TE is greater than or equal to the upper limit threshold value TEth(max) or is less than or equal to the lower limit threshold value TEth(min) in recording tracks adjacent to the record tack when the judgment is previously performed.

As a result of the judgment in the step S207, if it is judged that the rotation angle FGadr detected in the step S205 has the same value as that of the variable FG1 in the memory 22 (the step S207: Yes), it can be judged that the deterioration of the tracking error signal TE detected in the step S204 is detected at the same rotation angle and at least twice in a row. Therefore, it can be estimated that the deterioration of the tracking error signal detected in the step S204 is caused by the unexpected change in the refractive index because of the formation of the air bubble 140, the gel portion 150, or the like. In other words, it can be recognized that there is the unexpected change in the refractive index caused by the formation of the air bubble 140, the gel portion 150, or the like, in the position at which the rotation angle FGadr has the same value as that of the variable FG1 in the memory 22. Thus, it goes to a servo hold operation in the deterioration position of the tracking error signal caused by the unexpected change in the refractive index.

On the other hand, as a result of the judgment in the step S207, if it is judged that the rotation angle FGadr detected in the step S205 does not have the same value as that of the variable FG1 in the memory 22 (the step S207: No), it can be judged that the deterioration of the tracking error signal TE detected in the step S204 is not detected at the same rotation angle. Therefore, it can be considered that the deterioration of the tracking error signal TE detected in the step S204 is caused not by the unexpected change in the refractive index, which is caused by the formation of the air bubble 140, the gel portion 150, or the like, but by a disturbance. In other words, it can be recognized that the disturbance occurs accidentally in the position at which the rotation angle FGadr has the same value as that of the variable FG1 in the memory 22. Thus, the operational flow returns to the step S201 to set the flag flg to 0, and then the processes after the step S201 are continued.

Next, an aspect of a change in various signals used in the information recording/reproducing apparatus 1 performing the operation of detecting the deterioration of the tracking error signal TE caused by the unexpected change in the refractive index will be explained in more detail with reference to FIG. 7. FIG. 7 is a timing chart conceptually showing, along a time axis, the various control signals used in the information recording/reproducing apparatus 1 in the example, in the "operation of detecting the deterioration of the tracking error signal TE caused by the unexpected change in the refractive index".

FIG. 7 shows, in the top part, the tracking error signal TE, the upper limit threshold value TEth(max), and the lower limit threshold value TEth(min). If the tracking error signal TE is greater than or equal to the upper limit threshold value TEth(max) or is less than the lower limit threshold value TEth(min), a refractive index change detection signal reaches a high level. The refractive index detection signal is a signal indicating a result of the judgment in the step S204, and corresponds to the output of the first judgment circuit 191.

In FIG. 7, the refractive index change detection signal reaches the high level in timing of A. When the refractive index change detection signal reaches the high level, the rotation angle FGadr is detected by the rotation angle detection circuit 192. In FIG. 7, the FG signal when the refractive index change detection signal reaches the high level has an identification code of #8. Therefore, the rotation angle FGadr is 70 to 80 degrees. Moreover, the flag flg is set to "1".

After that, in the timing that the rotation angle FGadr is substantially 70 to 80 degrees, a refractive index change detection window is open. If the refractive index change detection signal reaches the high level while the refractive index change detection window is open, the operation of holding the tracking servo is performed, with the flag flg remaining to be "1". On the other hand, if the refractive index change detection signal reaches a low level while the refractive index change detection window is open, the flag flg is set to "0". That is, the refractive index change detection window is used to judge whether the refractive index change detection signal reaches the high level at the same rotation angle FGadr.

Moreover, the refractive index change detection window may be open even in the timing that the rotation angle FGadr is substantially 60 to 70 degrees and in the timing that the rotation angle FGadr is substantially 80 to 90 degrees, in addition to the timing that the rotation angle FGadr is substantially 70 to 80 degrees. In other words, the refractive index change detection window may be open even in the timing that the rotation angle FGadr of the optical disc 100 approximates or come close to the value of the variable FG1 in the memory 22, in addition to the timing that the rotation angle FGadr of the optical disc 100 has the same value as that of the variable FG1 in the memory 22.

Then, in timing of B at which the rotation angle FGadr is 70 to 80 degrees again after the optical disc 100 rotates one time, the refractive index change detection signal reaches the low level. Therefore, it can be considered that the deterioration of the tracking error signal TE detected in the timing of A is caused not by the unexpected change in the refractive index but by e.g. the disturbance. Thus, the flag flg is set to "0", and moreover, the refractive index change detection window is set to be always open.

Then, in timing of C after the optical disc 100 rotates several times, the refractive index change detection signal reaches the high level again. The rotation angle FGadr at this time is 40 to 50 degrees. Thus, the refractive index change detection window becomes open in the timing that the rotation angle becomes 40 to 50 degrees. Moreover, the flag flg is set to "1".

Then, even in timing of D at which the rotation angle FGadr is 40 to 50 degrees again after the optical disc 100 rotates one time, the refractive index change detection signal reaches the high level. Therefore, at this time point, the operation of holding the tracking servo is started. In other words, the hold operation is performed on the tracking error signal in the timing of D. Moreover, the flag flg continues to be "1".

Then, even in timing of E at which the rotation angle FGadr is 40 to 50 degrees again after the optical disc 100 rotates one time, the refractive index change detection signal reaches the high level. Therefore, at this time point, the operation of holding the tracking servo is started. In other words, the hold operation is performed on the tracking error signal in the timing of E. Moreover, the flag flg continues to be "1".

Incidentally, in the flowchart shown in FIG. 5, it is judged whether or not the rotation angle FGadr of the optical disc 100 has the same value as that of the variable FG1 in the memory 22 when the tracking error signal TE is greater than or equal to the upper limit threshold value TEth(max) or is less than the lower limit threshold value TEth(min). However, from another viewpoint, it may be judged whether or not the tracking error signal TE is greater than or equal to the upper limit threshold value TEth(max) or is less than the lower limit threshold value TEth(min) when the rotation angle FGadr of the optical disc 100 has the same value as that of the variable FG1 in the memory 22 (i.e. in synchronization with the timing that the optical disc 100 rotates one time). The operation in this case will be explained with reference to FIG. 8. FIG. 8 is a flowchart conceptually showing another flow of the "operation of detecting the deterioration of the tracking error signal TE caused by the unexpected change in the refractive index" of the recording operation of the information recording/reproducing apparatus 1 in the example.

As shown in FIG. 8, the operations from the step S201 to the step 205 are performed similarly to the operation example shown in FIG. 5.

Following the operation in the step S205, the flag flg is set to "1" by the operation of the flag circuit 21 (step S209), and the rotation angle detected in the step S205 is stored into the variable FG1 in the memory 22 (step S209).

Then, under the control of the microcomputer 19, it is judged whether or not the defect is detected between the predetermined period before and the current time (step S213).

As a result of the judgment in the step S213, if it is judged that the defect is detected (the step S213: Yes), the operational flow returns to the step S201 while performing the tracking control which is performed when the defect is detected.

On the other hand, as a result of the judgment in the step S213, if it is judged that the defect is not detected (the step S213: No), then the current rotation angle FGadr of the optical disc 100 is detected (step S215).

After that, by the operation of the second judgment circuit 193, it is judged whether or not the current rotation angle FGadr of the optical disc 100 detected in the step S215 has the same value as that of the variable FG1 in the memory 22 (step S218).

As a result of the judgment in the step S218, if it is judged that the current rotation angle FGadr of the optical disc 100 detected in the step S215 does not have the same value as that of the variable FG1 in the memory 22 (the step S218: No), the operational flow returns to the step S213 to rotate the optical disc 100 until the rotation angle FGadr of the optical disc 100 has the same value as that of the variable FG1 in the memory 22 while the defect detection is performed.

On the other hand, as a result of the judgment in the step S218, if the current rotation angle FGadr of the optical disc 100 detected in the step S215 has the same value as that of the variable FG1 in the memory 22 (the step S218: Yes), it is judged whether or not the tracking error signal TE generated at the rotation angle FGadr is greater than or equal to the threshold value TEth (i.e. is greater than or equal to the upper limit threshold value TEth(max) or is less than or equal to the lower limit threshold value TEth(min)) by the operation of the first judgment circuit 191 (step S214). That is, it is judged whether or not the tracking error signal TE deteriorates.

As a result of the judgment in the step S214, if the tracking error signal TE is not greater than nor equal to the upper limit threshold value TEth(max) and is not less than nor equal to the lower limit threshold value TEth(min) (the step S214: No), it can be judged that the deterioration of the tracking error signal TE detected in each of the step S204 and the step S214 is not detected at the same rotation angle. Therefore, it can be considered that the deterioration of the tracking error signal detected in the step S204 and the step S214 is caused not by the unexpected change in the refractive index but by the disturbance. Thus, the operational flow returns to the step S201 to set the flag flg to "0," and then the processes after the step S201 are continued.

On the other hand, as a result of the judgment in the step S214, if the tracking error signal TE is greater than or equal to the upper limit threshold value TEth(max) or is less than or equal to the lower limit threshold value TEth(min) (the step S214: Yes), it can be judged that the deterioration of the tracking error signal TE detected in each of the step S204 and the step S214 is detected at the same detection angle. Therefore, it can be considered that the deterioration of the tracking error signal detected in the step S204 and the step S214 is caused by the unexpected change in the refractive index. Thus, the operational flow goes to the servo hold operation in the deterioration position of the tracking error signal caused by the unexpected change in the refractive index.

As described above, the operation shown in FIG. 8 corresponds to the operation using the "refractive index change detection window" in FIG. 7. Moreover, obviously the information recording/reproducing apparatus 1 may perform an operation combining, if necessary, the operation shown in FIG. 8 and the operation shown in FIG. 5.

(3) Operation of Holding Tracking Servo in Deterioration Position of Tracking Error Signal Caused by Unexpected Change in Refractive Index Next, with reference to FIG. 9 to FIG. 11, a description will be given on a flow of the "operation of holding the tracking servo in a position at which the deterioration of the tracking error signal is caused by the unexpected change in the refractive index" of the recording operation of the information recording/reproducing apparatus 1 in the example. Incidentally, here, a description will be given on the flow of the hold operation with reference to FIG. 9, and a more detailed description will be given with reference to FIG. 10 and FIG. 11, as occasion demands. FIG. 9 is a flowchart conceptually showing the flow of the "operation of holding the tracking servo in the position at which the deterioration of the tracking error signal is caused by the unexpected change in the refractive index" of the recording operation of the information recording/reproducing apparatus 1 in the example.

As shown in FIG. 9, firstly, a counter cnt is set to "0" as an initial value by the operation of the counter circuit 20 (step S301).

Then, by the operation of the second judgment circuit 193, it is judged whether or not the current rotation angle FGadr has the same value as that of the variable FG1 in the memory 22 (step S302).

As a result of the judgment in the step S302, if it is judged that the current rotation angle FGadr does not have the same value as that of the variable FG1 in the memory 22 (the step S302: No), the operational flow returns to the step S301 again to rotate the optical disc 100 until the rotation angle FGadr of the optical disc 100 has the same value as that of the variable FG1 in the memory 22.

On the other hand, as a result of the judgment in the step S302, if the current rotation angle FGadr of the optical disc 100 has the same value as that of the variable FG1 in the memory 22 (the step S302: Yes), then it is judged whether or not the tracking error signal TE is greater than or equal to the upper limit threshold value TEth(max) or is less than or equal to the lower limit threshold value TEth(min) by the operation of the first judgment circuit 191 (step S303). That is, it is judged whether or not the tracking error signal TE, which is detected when the rotation angle FGadr of the optical disc 100 has the same value as that of the variable FG1 in the memory 22, deteriorates.

As a result of the judgment in the step S303, if it is judged that the tracking error signal TE is greater than or equal to the upper limit threshold value TEth(max) or is less than or equal to the lower limit threshold value TEth(min) (the step S303: Yes), the operation of holding the tracking servo is performed by the operation of the hold circuit 194 while the tracking error signal TE is greater than or equal to the upper limit threshold value TEth(max) or is less than or equal to the lower limit threshold value TEth(min), and while the rotation angle FGadr of the optical disc 100 has the same value as that of the variable FG1 in the memory 22 (step S304). Then, if the tracking error signal TE becomes less than the upper limit threshold value TEth(max) or becomes greater than the lower limit threshold value TEth(min), or if the rotation angle FGadr of the optical disc 100 no longer has the same value as that of the variable FG1 in the memory 22, the operation of holding the tracking servo is stopped by the operation of the stop circuit 195 to operate the normal tracking servo.

Here, with reference to FIG. 10, the operation of holding the tracking servo will be explained. FIG. 10 is a timing chart conceptually showing, along a time axis, each of the tracking error signal TE and a tracking servo control signal used in the information recording/reproducing apparatus 1 in the example, in the "operation of holding the tracking servo in the position at which the deterioration of the tracking error signal is caused by the unexpected change in the refractive index".

As shown in an upper graph of FIG. 10, it is assumed that the tracking error signal TE deteriorates due to the unexpected change in the refractive index. At this time, if the tracking error signal TE is greater than or equal to the threshold value TE (i.e. a portion shown in a thick line of the upper graph of FIG. 10), the operation of holding the tracking servo is performed.

The operation of holding the tracking servo in the example means the operation which performs the tracking control regarding the tracking error signal TE as "0" regardless the actual numeral value of the tracking error signal TE, or the operation which performs the tracking control regarding the tracking error signal TE as the DC component of the tracking error signal before the detection of the deterioration of the tracking error signal TE. This hold operation is performed when the tracking error signal TE deteriorates even though the laser beam LB is actually irradiated near the center of the recording track. Therefore, by performing the hold operation when the tracking error signal TE deteriorates due to the unexpected change in the refractive index described above, it is possible to prevent such a disadvantage that the tracking control is performed on the basis of, so to speak, the incorrect tracking error signal TE.

However, before the hold operation is performed, the tracking control is performed for a certain period of time on the basis of the incorrect tracking error signal TE (i.e. the portion shown in a dashed line of the upper graph of FIG. 10). Therefore, it is necessary to displace the optical pickup 12 in an opposite direction, by the distance that the optical pickup 12 is displaced by this tracking control. In other words, it is necessary to return the optical pickup 12 displaced on the basis of the incorrect tracking error signal TE, to a position at which the laser beam can be irradiated near the center of the recording track (in other words, an initial position). In this case, as shown in a lower graph of FIG. 10, a tracking servo control signal, which can cancel a tracking amount of the optical pickup 12 by the tracking servo control signal until the hold operation is performed, is supplied to the optical pickup 12 by the driver 13 controlled by the hold circuit 194 after the hold operation.

In FIG. 9 again, as a result of the judgment in the step S303, if it is judged that the tracking error signal TE is not greater than nor equal to the upper limit threshold value TEth(max) and is not less than nor equal to the lower limit threshold value TEth(min) (the step S303: No), then the counter cnt is incremented by "1" by the operation of the counter circuit 20 (step S305).

After that, it is judged whether or not the counter cnt is greater than or equal to 2 by the operation of e.g. the stop circuit 195 (step S306).

As a result of the judgment in the step S306, if it is judged that the counter cnt is not greater than nor equal to 2 (the step S306: No), the operational flow returns to the step S302 again to continue the processes after the step S302.

On the other hand, as a result of the judgment in the step S306, if it is judged that the counter cnt is greater than or equal to 2 (the step S306: Yes), the tracking error signal TE does not deteriorate when the rotation angle FGadr of the optical disc 100 has the same value as that of the variable FG1 in the memory 22 two times or more in a row. More specifically, the tracking error signal TE does not deteriorate in a recording area on a first track, at which the rotation angle has the same value as that of the variable FG1 in the memory 22, and the tracking error signal TE does not deteriorate in a recording area on a second track adjacent to the first recording track, at which the rotation angle has the same value as that of the variable FG1 in the memory 22. That is, it can be considered that the unexpected change in the refractive index cannot be recognized in a time of two rotations or more in a row. By this, it can be considered that there is already no unexpected change in the refractive index in the position at which the rotation angle FGadr has the same value as that of the variable FG1 in the memory 22. Thus, the operation of holding the tracking servo is ended to return to the step S102 or the step S104 in FIG. 4 and continue the processes.

Next, with reference to FIG. 11, a more detailed description will be given on an aspect of a change in various signals used in the information recording/reproducing apparatus 1 which performs the operation of holding the tracking servo of the tracking error signal TE at the deterioration position of the tracking error signal TE caused by the unexpected change in the refractive index. FIG. 11 is a timing chart conceptually showing, along a time axis, various control signals used in the information recording/reproducing apparatus 1 in the example, in the "operation of holding tracking servo in the position at which the deterioration of the tracking error signal TE is caused by the unexpected change in the refractive index".

FIG. 11 shows, in the top part, the tracking error signal TE, the upper limit threshold value TEth(max), and the lower limit threshold value TEth(min). If the tracking error signal TE is greater than or equal to the upper limit threshold value TEth(max) or is less than the lower limit threshold value TEth(min), and if the rotation angle FGadr of the optical disc 100 has the same value as that of the variable FG1 in the memory 22 (about 50 degrees in FIG. 11), a hold signal reaches a high level in which the operation of holding the tracking servo is performed.

For example, in timing of A at which the rotation angle FGadr of the optical disc 100 is 40 to 50 degrees, the tracking error signal TE is greater than or equal to the upper limit threshold value TEth(max) or is less than the lower limit threshold value TEth(min). Thus, the hold signal reaches the high level at the timing of A, in which the operation of holding the tracking servo is performed.

Moreover, the hold operation may be performed even in the timing that the rotation angle FGadr of the optical disc 100 is substantially 30 to 40 degrees and in the timing that the rotation angle FGadr is substantially 50 to 60 degrees, in addition to the timing that the rotation angle FGadr of the optical disc 100 is substantially 40 to 50 degrees. In other words, the hold operation may be performed even in the timing that the rotation angle FGadr of the optical disc 100 approximates or come close to the value of the variable FG1 in the memory 22, in addition to the timing that the rotation angle FGadr of the optical disc 100 has the same value as that of the variable FG1 in the memory 22.

Then, in timing of B at which the rotation angle FGadr is 40 to 50 degrees again after the optical disc 100 rotates one time, the tracking error signal TE is greater than or equal to the upper limit threshold value TEth(max) or is less than the lower limit threshold value TEth(min). Thus, the hold signal reaches the high level at the timing of B, in which the operation of holding the tracking servo is performed.

Then, in timing of C at which the rotation angle FGadr is 40 to 50 degrees again after the optical disc 100 rotates one time, the tracking error signal TE is greater than or equal to the upper limit threshold value TEth(max) or is less than the lower limit threshold value TEth(min). Thus, the hold signal reaches the high level at the timing of C, in which the operation of holding the tracking servo is performed.

Then, in timing of D at which the rotation angle FGadr is 40 to 50 degrees again after the optical disc 100 rotates one time, the tracking error signal TE is not greater than nor equal to the upper limit threshold value TEth(max) and is not less than the lower limit threshold value TEth(min). Thus, the hold signal remains the low level at the timing of D, in which the operation of holding the tracking servo is not performed. Moreover, the counter cnt is incremented by "1", and the counter cnt becomes "1".

Then, in timing of E at which the rotation angle FGadr is 40 to 50 degrees again after the optical disc 100 rotates one time, the tracking error signal TE is not greater than nor equal to the upper limit threshold value TEth(max) and is not less than the lower limit threshold value TEth(min). Thus, the hold signal remains the low level at the timing of E, in which the operation of holding the tracking servo is not performed. Moreover, the counter cnt is incremented by "1", and the counter cnt becomes "2".

Here, since the counter cnt is greater than or equal to "2", the hold operation is stopped to start the normal tracking control at this time point. Moreover, the operation of detecting the deterioration of the tracking error signal TE caused by the unexpected change in the refractive index is started again.

As explained above, according to the information recording/reproducing apparatus 1 in the example, it is possible to preferably identify the cause of the deterioration of the tracking error signal TE. More specifically, if the defect detection signal is at the high level, it can be identified that the deterioration of the tracking error signal TE is caused by the defect. If the defect detection signal is at the low level and there are many deteriorations in the tracking error signal TE while the optical disc 100 rotates one time, it can be identified that the distortion of the tracking error signal TE is caused by the disturbance. Moreover, by the aforementioned detection operation, it can be identified that the deterioration of the tracking error signal TE is caused by the unexpected change in the refractive index.

Moreover, because the cause of the deterioration of the tracking error signal TE can be preferably identified, it is possible to perform the preferable tracking control according to the cause. More specifically, if it is identified that the deterioration of the tracking error signal TE is caused by the defect, the operation of holding the tracking servo is performed. If it is identified that the deterioration of the tracking error signal TE is caused by the disturbance, the normal tracking control (in other words, the tracking servo without the hold operation) is performed. Moreover, if it is identified that the deterioration of the tracking error signal TE is caused by the air bubble, the operation of holding the tracking servo is performed. Therefore, regardless of the cause of the deterioration of the tracking error signal TE, it is possible to perform the preferable tracking control. As a result, it is possible to irradiate the desired recording track with the laser beam, to thereby inhibit or prevent such a disadvantage that the recording track adjacent to the desired recording track is tracked.

In addition, if the deterioration of the tracking error signal TE is caused by the unexpected change in the refractive index, it is possible to go to the operation of holding the tracking servo, relatively quickly. Thus, it is possible to relatively reduce a period in which the incorrect tracking control is performed, which allows the tracking control to be performed more preferably. In particular, in performing the recording operation, the recording film 120 is irradiated with the laser beam LB with a recordable power. Thus, by relatively reducing the period in which the incorrect tracking control is performed, it is possible to eliminate such a disadvantage that the data is recorded in an incorrect position, as much as possible.

In addition, by updating a program, such as firmware, that operates on the microcomputer 19, the information recording/reproducing apparatus 1 in the example can be realized. In other words, the information recording/reproducing apparatus 1 in the example can be realized without newly adding a physical circuit, such as various IC chips, and a physical constituent element, such as a sensor. Therefore, it is unnecessary to significantly change the circuit structure of the information recording/reproducing apparatus 1, so that it is possible to reduce a cost necessary to adopt the information recording/reproducing apparatus 1 in the example.

Incidentally, in the aforementioned explanation, after one unexpected change in the refractive index is detected, the operation of holding the tracking servo is performed in response to the detected one unexpected change in the refractive index. However, even if the one unexpected change in the refractive index is detected, the presence of another unexpected change in the refractive index may be detected while the operation of holding the tracking servo is performed in response to the detected one unexpected change in the refractive index. That is, a plurality of hold operations and a plurality of detection operations may be performed simultaneously and exclusively. In particular, if there are two or more unexpected changes in the refractive index in each recording track of the optical disc 100, it is considered that the plurality of hold operations and the plurality of detection operations are frequently performed simultaneously and exclusively. In this case, it is preferable to prepare a plurality of variables, FG1, FG2, . . . , FGx (wherein x is 2 or more) which indicate the positions of the unexpected changes in the refractive index (specifically, the rotation angles of the optical disc 100 in the positions of the air bubbles 140). Then, with respect to the variables of FG1, FG2, . . . , FGx, the aforementioned detection operations are performed exclusively (in other words, without considering another variable) and the aforementioned hold operations are performed exclusively (in other words, without considering another variable). By this, even if there are two or more unexpected changes in the refractive index in each recording track of the optical disc 100, the aforementioned various benefits can be received preferably.

With reference to FIG. 12 and FIG. 13, a more detailed description will be given on an aspect of the change in various signals used in the information recording/reproducing apparatus 1 in this case. FIG. 12 is a timing chart conceptually showing, along a time axis, various control signals used in the information recording/reproducing apparatus in the example, in when the plurality of the "operations of detecting the deterioration of the tracking error signal TE caused by the unexpected change in the refractive index" are performed simultaneously. FIG. 13 is a timing chart conceptually showing, along a time axis, various control signals used in the information recording/reproducing apparatus in the example, when the plurality of the "operations of holding tracking servo in the position in which the deterioration of the tracking error signal is generated by the unexpected change in the refractive index" are performed simultaneously.

In FIG. 12 indicating the detection operation, the refractive index change detection signal reaches the high level in the timing of A. When the refractive index change detection signal reaches the high level, the rotation angle FGadr is detected by the rotation angle detection circuit 192. In FIG. 12, the FG signal when the refractive index change detection signal reaches the high level has an identification code of #8. Therefore, the rotation angle FGadr is 70 to 80 degrees. Moreover, the first flag flg1 is set to "1". Furthermore, a first variable FG1 becomes 70 to 80 degrees (or #8).

Then, in timing of B in which the rotation angle FGadr is 70 to 80 degrees again after the optical disc 100 rotates one time, the refractive index change detection signal reaches the low level. Therefore, it can be considered that the deterioration of the tracking error signal TE detected in the timing of A is caused not by the unexpected change in the refractive index but by e.g. the disturbance. Thus, a first flag flg1 is set to "0. Moreover, the first variable FG1 is reset.

Then, in timing of C1 after the optical disc 100 rotates several times, the refractive index change detection signal reaches the high level again. The rotation angle FGadr at this time is 30 to 40 degrees. Thus, the first flag flg1 is set to "1". Moreover, the first variable FG1 becomes 30 to 40 degrees (or #4).

Then, in timing of C2 before the optical disc 100 rotates one time, the refractive index change detection signal reaches the high level again. The rotation angle FGadr at this time is 50 to 60 degrees. Thus, another system for detecting a position in which the there is the unexpected change in the refractive index is prepared. Specifically, a second flag flg2 is set to "1". Moreover, a second variable FG2 becomes 50 to 60 degrees (or #6).

Then, even in timing of D1 in which the rotation angle FGadr is 30 to 40 degrees again after the optical disc 100 rotates, the refractive index change detection signal reaches the high level. Therefore, after this, the operation of holding the tracking servo is performed in the timing that the rotation angle FGadr is 30 to 40 degrees. Moreover, the first flag flg1 continues to be "1".

Then, even in timing of D2 in which the rotation angle FGadr is 50 to 60 degrees again after the optical disc 100 rotates, the refractive index change detection signal reaches the high level. Therefore, after this, the operation of holding the tracking servo is performed in the timing that the rotation angle FGadr is 50 to 60 degrees. Moreover, the second flag flg2 continues to be "1".

Then, even in timing of E1 in which the rotation angle FGadr is 30 to 40 degrees again after the optical disc 100 rotates, the refractive index change detection signal reaches the high level. Therefore, the operation of holding the tracking servo continues to be performed in the timing that the rotation angle FGadr is 30 to 40 degrees. Moreover, the first flag flg1 continues to be "1".

Then, even in timing of E2 in which the rotation angle FGadr is 50 to 60 degrees again after the optical disc 100 rotates, the refractive index change detection signal reaches the high level. Therefore, the operation of holding the tracking servo continues to be performed in the timing that the rotation angle FGadr is 50 to 60 degrees. Moreover, the second flag flg2 continues to be "1".

Then, even in timing of F1 in which the rotation angle FGadr is 30 to 40 degrees again after the optical disc 100 rotates, the refractive index change detection signal reaches the high level. Therefore, the operation of holding the tracking servo continues to be performed in the timing that the rotation angle FGadr is 30 to 40 degrees. Moreover, the first flag flg1 continues to be "1".

Then, even in timing of F2 in which the rotation angle FGadr is 50 to 60 degrees again after the optical disc 100 rotates, the refractive index change detection signal reaches the low level. Therefore, the second flag flg2 is set to "0", and it is judged whether or not to stop the hold operation (refer to FIG. 9).

Then, as shown in FIG. 13 indicating the hold operation, in timing of A1 in which the rotation angle FGadr of the optical disc 100 is 30 to 40 degrees, the tracking error signal TE is greater than or equal to the upper limit threshold value TEth (max) or is less than the lower limit threshold value TEth (min). Thus, a first hold signal #1 becomes the high level in the timing of A1, and the operation of holding the tracking servo is performed. Moreover, a first counter cnt1 is set to "0".

In the same manner, even in timing of A2 in which the rotation angle FGadr of the optical disc 100 is 50 to 60 degrees, the tracking error signal TE is greater than or equal to the upper limit threshold value TEth(max) or is less than the lower limit threshold value TEth(min). Thus, a second hold signal #2 becomes the high level in the timing of A2, and the operation of holding the tracking servo is performed. Moreover, a second counter cnt2 is set to "0".

Then, even in timing of B1 in which the rotation angle FGadr is 30 to 40 degrees again after the optical disc 100 rotates, the tracking error signal TE is greater than or equal to the upper limit threshold value TEth(max) or is less than the lower limit threshold value TEth(min). Thus, the first hold signal #1 becomes the high level in the timing of B1, and the operation of holding the tracking servo is performed.

Then, even in timing of B2 in which the rotation angle FGadr is 50 to 60 degrees again after the optical disc 100 rotates, the tracking error signal TE is greater than or equal to the upper limit threshold value TEth(max) or is less than the lower limit threshold value TEth(min). Thus, the second hold signal #2 becomes the high level in the timing of B2, and the operation of holding the tracking servo is performed.

Then, even in timing of C1 in which the rotation angle FGadr is 30 to 40 degrees again after the optical disc 100 rotates, the tracking error signal TE is greater than or equal to the upper limit threshold value TEth(max) or is less than the lower limit threshold value TEth(min). Thus, the first hold signal #1 becomes the high level in the timing of C1, and the operation of holding the tracking servo is performed.

On the other hand, in timing of C2 in which the rotation angle FGadr is 50 to 60 degrees again after the optical disc 100 rotates, the tracking error signal TE is not greater than nor equal to the upper limit threshold value TEth(max) and is not less than the lower limit threshold value TEth(min). Thus, the second hold signal #2 becomes the low level in the timing of C2, and the operation of holding the tracking servo is not performed. Moreover, the second counter cnt2 is incremented by "1", and the second counter cnt2 becomes "1".

Then, even in timing of D1 in which the rotation angle FGadr is 30 to 40 degrees again after the optical disc 100 rotates, the tracking error signal TE is not greater than nor equal to the upper limit threshold value TEth(max) and is not less than the lower limit threshold value TEth(min). Thus, the first hold signal #1 becomes the low level in the timing of D1, and the operation of holding the tracking servo is not performed. Moreover, the first counter cnt1 is incremented by "1", and the first counter cnt1 becomes "1".

On the other hand, in timing of D2 in which the rotation angle FGadr is 50 to 60 degrees again after the optical disc 100 rotates, the tracking error signal TE is not greater than nor equal to the upper limit threshold value TEth(max) and is greater than or equal to the lower limit threshold value TEth (min). Thus, the second hold signal #2 becomes the low level in the timing of D2, and the operation of holding the tracking servo is not performed. Moreover, the second counter cnt2 is incremented by "1", and the second counter cnt2 becomes "2". Therefore, the operation of holding the tracking servo is ended in the timing that the rotation angle FGadr is 50 to 60 degrees.

As described above, the plurality of hold operations and the plurality of detection operations are performed simultaneously and exclusively.

Incidentally, from the viewpoint of maintaining the stable tracking operation or recording operation, it is preferable to set an upper limit for the number of x which indicates the number of the hold operations and the detection operations that are performed simultaneously (i.e. the number of the positions in which there is the unexpected change in the refractive index, which can be detected on the same recording track). For example, it is preferable that x☐2. Of course, the number of 2 or more may be set as the upper limit of x. If the number of the positions in which there is the unexpected change in the refractive index is beyond the upper limit of x, it is desirably judged that the deterioration of the tracking error signal TE is caused by the disturbance, and the operation of holding the tracking servo is desirably not performed.

Moreover, in the aforementioned example, the operation of holding the tracking servo is performed in the position in which the tracking error signal TE deteriorates because of the unexpected change in the refractive index; however, instead of performing the hold operation, the gain of the tracking servo may be adjusted (specifically, for example, the gain is reduced).

Moreover, in setting the threshold value TEth, the threshold value TEth may be set in the following method, instead of the aforementioned method, considering that the unexpected change in the refractive index may have an effect on the remaining component of the tracking error signal TE. Now, with reference to FIG. 14, another method of setting the threshold value TEth will be explained. FIG. 14 is a graph conceptually showing another threshold value TEth of the tracking error signal TE.

As shown in FIG. 14, the remaining component of the tracking error signal TE (preferably, the remaining component of the tracking error signal TE obtained by rotating the optical disc 100 one time) is divided into a plurality of sections (sections #1 to #8) along the time axis. Then, the maximum value and the minimum value in each section are extracted.

In this method, the upper limit threshold value TEth(max) is set to an average value of the third largest maximum value TEn(max3) of the maximum values in the respective sections and the maximum value TE(max) of the tracking error signal TE. That is, TEth(max)=(TE(max)+TEn(max3))/2.

Moreover, the lower limit threshold value TEth(min) is set to an average value of the third smallest minimum value TEn(min3) of the minimum values in the respective sections and the minimum value TE(min) of the tracking error signal TE. That is, TEth(min)=(TE(min)+TEn(min3))/2.

This is because the possibility cannot be denied that the largest maximum value TEn(max1) and the second largest maximum value TEn(max2) of the maximum values in the respective sections are caused by the unexpected change in the refractive index. In the same manner, the possibility cannot be also denied that the smallest minimum value TEn (min1) and the second smallest minimum value TEn(min2) of the minimum values in the respective sections are caused by the unexpected change in the refractive index. Therefore, in order not to have an influence of the unexpected change in the refractive index in setting the threshold value TEth, it is preferable to set the threshold value TEth using the third largest maximum value TEn(max3) of the maximum values in the respective sections and the third smallest minimum value TEn(min3) of the minimum values in the respective sections.

Of course, the threshold value TEth may be set using the X-th largest maximum value TEn(maxX) of the maximum values in the respective sections (wherein X is an integer of 2 or more) and the Y-th smallest minimum value TEn(minY) of the minimum values in the respective sections (wherein Y is an integer of 2 or more).

Moreover, in the aforementioned example, an explanation is given on the optical disc 100 as one example of the information recording medium and the recorder or player related to the optical disc as one example of the information recording/reproducing apparatus; however, the present invention is not limited to the optical disc and the recorder or player for the optical disc, and it can be also applied to other various information recording media which support high-density recording or high transmission rate, and recorders or players for the various information recording media.

The present invention is not limited to the aforementioned embodiment, but various changes may be made, if desired, without departing from the essence or spirit of the invention which can be read from the claims and the entire specification. An information recording apparatus and method, an information reproducing apparatus and method, and a computer program for recording control or for reproduction control, all of which involve such changes, are also intended to be within the technical scope of the present invention.

INDUSTRIAL APPLICABILITY

The information recording apparatus and method, the information reproducing apparatus and method, and the computer program according to the present invention can be applied to an information recording apparatus, such as a DVD recorder, and an information reproducing apparatus, such as a DVD player. Moreover, they can be applied to an information recording apparatus, an information reproducing apparatus, or the like, which is mounted on various computer equipment for consumer use or for commercial use, or which can be connected to various computer equipment.

The invention claimed is:

1. An information recording apparatus comprising:
a first judging device for judging whether or not an absolute value of a tracking error signal is greater than or equal to a predetermined first threshold value;
a detecting device for detecting, as a detection angle, a rotation angle of an information recording medium when it is judged that the absolute value of the tracking error signal is greater than or equal to the first threshold value;
a second judging device for judging whether or not the judgment that the absolute value of the tracking error signal is greater than or equal to the first threshold value is performed at the same detection angle;
a holding device for holding tracking servo near the detection angle if it is judged by said second judging device that the judgment that the absolute value of the tracking error signal is greater than or equal to the first threshold value is performed, at the same detection angle; and a stopping device for stopping the hold of the tracking servo if it is judged by said second judging device that the judgment that the absolute value of the tracking error signal is not greater than nor equal to the first threshold value is performed, at the same detection angle, each of the judgment by said first judging device, the detection by said detecting device, and the judgment by said second judging device being performed in parallel with information recording onto the information recording medium.

2. The information recording apparatus according to claim 1, wherein the information recording medium comprises a spiral or concentric recording track, and said second judging device judges whether or not the judgment that the absolute value of the tracking error signal is greater than or equal to the first threshold value is performed at the detection angle on the recording track adjacent to the recording track in which it is judged that the absolute value of the tracking error signal is greater than or equal to the first threshold value.

3. The information recording apparatus according to claim 1, further comprising:

a first flag device for setting a detection flag to a valid value when it is judged that the absolute value of the tracking error signal is greater than or equal to the first threshold value, at the detection angle;

a second flag device for setting the detection flag to an invalid value when it is judged that the absolute value of the tracking error signal is not greater than nor equal to the first threshold value, at the detection angle; and said second judging device judging whether or not the judgment that the absolute value of the tracking error signal is greater than or equal to the first threshold value is performed when the detection flag is set to the valid value.

4. The information recording apparatus according to claim 1, wherein said first judging device judges whether or not the absolute value of the tracking error signal is greater than or equal to the first threshold value if a defect detection signal is at a low level, the defect detection signal indicating presence or absence of a defect on the information recording medium.

5. The information recording apparatus according to claim 1, wherein the first threshold value is at least one of an average value between a maximum value that can be taken by the tracking error signal and a maximum value of a remaining component of the tracking error signal, and an average value between a minimum value that can be taken by the tracking error signal and a minimum value of the remaining component of the tracking error signal.

6. The information recording apparatus according to claim 1, wherein the first threshold value is at least one of an average value between an at least second or more largest maximum value of maximum values in a plurality of sampling sections when the tracking error signal is divided by the plurality of sampling sections and an at least second or more largest maximum value of maximum values in a plurality of sampling sections when a remaining component of the tracking error signal is divided by the plurality of sampling sections, and an average value between an at least second or more smallest minimum value of minimum values in the plurality of sampling sections and an at least second or more smallest minimum value of minimum values in the plurality of sampling sections.

7. The information recording apparatus according to claim 1, wherein the holding device holds the tracking servo if it is judged that the absolute value of the tracking error signal is greater than or equal to the first threshold value, near the detection angle.

8. The information recording apparatus according to claim 1, further comprising:

an incrementing device for incrementing a count value;

a controlling device for controlling said incrementing device to increment the count value if it is judged the absolute value of the tracking error signal is not greater than nor equal to the first threshold value, near the detection angle; and a setting device for setting the count value to an initial value if it is judged that the absolute value of the tracking error signal is greater than or equal to the first threshold value, near the detection angle, said stopping device stopping the hold of the tracking servo if the count value is greater than or equal to a predetermined second threshold value.

9. A computer-readable recording medium recording, in a non-transitory state, thereon a computer program of instructions executable by a computer provided in the information recording apparatus according to claim 1, the computer program making the computer function as said first judging device, said detecting device, said second judging device, said holding device, and said stopping device.

10. The information recording apparatus according to claim 1, wherein an absolute value of the first threshold value is less than each absolute value of a maximum value and a minimum value that can be taken by the tracking error signal.

11. An information recording method comprising:

a first judging process of judging whether or not an absolute value of a tracking error signal is greater than or equal to a predetermined first threshold value;

a detecting process of detecting, as a detection angle, a rotation angle of an information recording medium when it is judged that the absolute value of the tracking error signal is greater than or equal to the first threshold value;

a second judging process of judging whether or not the judgment that the absolute value of the tracking error signal is greater than or equal to the first threshold value is performed at the same detection angle;

a holding process of holding tracking servo near the detection angle if it is judged by said second judging process that the judgment that the absolute value of the tracking error signal is greater than or equal to the first threshold value is performed, at the same detection angle; and a stopping process of stopping the hold of the tracking servo if it is judged by said second judging process that the judgment that the absolute value of the tracking error signal is not greater than nor equal to the first threshold value is performed, at the same detection angle, each of the judgment by said first judging process, the detection by said detecting process, and the judgment by said second judging process being performed in parallel with information recording onto the information recording medium.

12. An information reproducing apparatus comprising:

a first judging device for judging whether or not an absolute value of a tracking error signal is greater than or equal to a predetermined first threshold value;

a detecting device for detecting, as a detection angle, a rotation angle of an information recording medium when it is judged that the absolute value of the tracking error signal is greater than or equal to the first threshold value;

a second judging device for judging whether or not the judgment that the absolute value of the tracking error signal is greater than or equal to the first threshold value is performed at the same detection angle;

a holding device for holding tracking servo near the detection angle if it is judged by said second judging device that the judgment that the absolute value of the tracking error signal is greater than or equal to the first threshold value is performed, at the same detection angle; and a stopping device for stopping the hold of the tracking servo if it is judged by said second judging device that the judgment that the absolute value of the tracking error signal is not greater than nor equal to the first threshold value is performed, at the same detection angle, each of the judgment by said first judging device, the detection by said detecting device, and the judgment by said second judging device being performed in parallel with information reproduction onto the information recording medium.

13. A computer-readable recording medium recording, in a non-transitory state, thereon a computer of instructions executable by a computer provided in the information reproducing apparatus according to claim 12, the computer program making the computer function as said first judging device, said detecting device, said second judging device, said holding device, and said stopping device.

14. An information reproducing method comprising:

a first judging process of judging whether or not an absolute value of a tracking error signal is greater than or equal to a predetermined first threshold value;

a detecting process of detecting, as a detection angle, a rotation angle of an information recording medium when it is judged that the absolute value of the tracking error signal is greater than or equal to the first threshold value;

a second judging process of judging whether or not the judgment that the absolute value of the tracking error signal is greater than or equal to the first threshold value is performed at the same detection angle;

a holding process of holding tracking servo near the detection angle if it is judged by said second judging process that the judgment that the absolute value of the tracking error signal is greater than or equal to the first threshold value is performed, at the same detection angle; and a stopping process of stopping the hold of the tracking servo if it is judged by said second judging process that the judgment that the absolute value of the tracking error signal is not greater than nor equal to the first threshold value is performed, at the same detection angle, each of the judgment by said first judging process, the detection by said detecting process, and the judgment by said second judging process being performed in parallel with information reproduction onto the information recording medium.

* * * * *